United States Patent
Crawford et al.

(10) Patent No.: US 12,282,121 B2
(45) Date of Patent: Apr. 22, 2025

(54) SONAR STEERING SYSTEMS AND ASSOCIATED METHODS

(71) Applicant: Navico, Inc., Tulsa, OK (US)

(72) Inventors: Christopher D. Crawford, Bixby, OK (US); Jayme Caspall, Tulsa, OK (US)

(73) Assignee: Navico, Inc., Tulsa, OK (US)

( * ) Notice: Subject to any disclaimer, the term of this patent is extended or adjusted under 35 U.S.C. 154(b) by 50 days.

(21) Appl. No.: 17/326,409

(22) Filed: May 21, 2021

(65) Prior Publication Data

US 2022/0373662 A1    Nov. 24, 2022

(51) Int. Cl.
*G01S 7/521*   (2006.01)
*G01S 7/62*    (2006.01)
*G01S 15/96*   (2006.01)

(52) U.S. Cl.
CPC ............ *G01S 7/521* (2013.01); *G01S 7/6218* (2013.01); *G01S 15/96* (2013.01)

(58) Field of Classification Search
CPC ......... G01S 7/521; G01S 7/6218; G01S 15/96
See application file for complete search history.

(56) References Cited

U.S. PATENT DOCUMENTS

| | | |
|---|---|---|
| 2,877,733 A | 3/1959 | Harris |
| 3,598,947 A | 8/1971 | Osborn |
| 3,807,345 A | 4/1974 | Peterson |
| 4,982,924 A * | 1/1991 | Havins ................. G10K 11/006 248/295.11 |
| 5,293,351 A | 3/1994 | Noponen |
| 5,420,828 A | 5/1995 | Geiger |
| 5,892,338 A | 4/1999 | Moore et al. |
| 6,054,831 A | 4/2000 | Moore et al. |
| 6,181,644 B1 | 1/2001 | Gallagher |
| 6,325,684 B1 | 12/2001 | Knight |

(Continued)

FOREIGN PATENT DOCUMENTS

| | | |
|---|---|---|
| CA | 2887031 A1 | 10/2015 |
| CA | 2984303 C | 8/2022 |

(Continued)

OTHER PUBLICATIONS

"Minn Kota RIPTIDE ST Foot Pedal Accessory User Manual;" retrieved Dec. 7, 2017; 4 pages.

(Continued)

*Primary Examiner* — Isam A Alsomiri
*Assistant Examiner* — Abdallah Abulaban
(74) *Attorney, Agent, or Firm* — Nelson Mullins Riley & Scarborough LLP

(57) ABSTRACT

Sonar steering systems offering improved functionality and ease of use for an operator (e.g., an angler) are provided. A sonar steering system is configured to automatically adjust the directional coverage volume of the sonar system in a hands-free manner to allow the operator to focus on other tasks. Some such sonar steering systems are configured to adjust the directional coverage volume of the sonar transducers to maintain a target such as an area of interest (AOI) within the sonar display despite movement of the watercraft relative to the target. Accordingly, the coverage volume may be automatically adjusted to maintain the aim of the sonar transducers at a target that is moving through the water, such as a school of fish.

16 Claims, 15 Drawing Sheets

(56) References Cited

U.S. PATENT DOCUMENTS

| | | |
|---|---|---|
| 6,447,347 B1 | 9/2002 | Steinhauser |
| 6,504,794 B2 | 1/2003 | Haase et al. |
| 6,507,164 B1 | 1/2003 | Healey et al. |
| 6,524,144 B2 | 2/2003 | Pasley |
| 6,661,742 B2 | 12/2003 | Hansen |
| 6,678,589 B2 | 1/2004 | Robertson et al. |
| 6,868,360 B1 | 3/2005 | Olstad et al. |
| 6,870,794 B2 | 3/2005 | Healey |
| 6,899,574 B1 | 5/2005 | Kalis et al. |
| 6,902,446 B1 | 6/2005 | Healey |
| 6,909,946 B1 | 6/2005 | Kabel et al. |
| 6,919,704 B1 | 7/2005 | Healey |
| 7,004,804 B2 | 2/2006 | Bernloehr et al. |
| 7,190,636 B1 | 3/2007 | Depaola |
| 7,195,526 B2 | 3/2007 | Bernloehr et al. |
| 7,268,703 B1 | 9/2007 | Kabel et al. |
| 7,303,595 B1 | 12/2007 | Janitz |
| 7,371,218 B2 | 5/2008 | Walston et al. |
| 7,430,461 B1 | 9/2008 | Michaels |
| 7,452,251 B2 | 11/2008 | Boebel |
| 7,538,511 B2 | 5/2009 | Samek |
| D594,034 S | 6/2009 | Bernloehr et al. |
| 7,542,376 B1 | 6/2009 | Thompson et al. |
| 7,633,431 B1 | 12/2009 | Wey |
| 7,722,417 B2 | 5/2010 | Bernloehr et al. |
| 7,889,600 B2 | 2/2011 | Thompson et al. |
| 8,106,617 B1 | 1/2012 | Holley |
| 8,195,084 B2 | 6/2012 | Xiao |
| 8,221,175 B2 | 7/2012 | Mynster |
| 8,305,844 B2 | 11/2012 | DePasqua |
| 8,645,012 B2 | 2/2014 | Salmon et al. |
| 8,761,976 B2 | 6/2014 | Salmon et al. |
| 8,814,129 B2 | 8/2014 | Todd et al. |
| 8,879,359 B2 | 11/2014 | DePasqua |
| 8,888,065 B2 | 11/2014 | Logan |
| 8,896,480 B1 | 11/2014 | Wilson et al. |
| 8,991,280 B2 | 3/2015 | Wireman |
| 9,127,707 B1 | 9/2015 | Huntley |
| 9,132,900 B2 | 9/2015 | Salmon et al. |
| 9,135,731 B2 | 9/2015 | Lauenstein et al. |
| 9,160,210 B2 | 10/2015 | Perry |
| 9,162,743 B1 | 10/2015 | Grace et al. |
| 9,201,142 B2 | 12/2015 | Antao |
| 9,278,745 B2 | 3/2016 | Kooi, Jr. et al. |
| 9,290,256 B1 | 3/2016 | Wireman et al. |
| 9,296,455 B2 | 3/2016 | Bernloehr et al. |
| 9,322,915 B2 | 4/2016 | Betts et al. |
| 9,354,311 B2 | 5/2016 | Chen et al. |
| 9,394,040 B2 | 7/2016 | Grace et al. |
| 9,459,350 B2 | 10/2016 | Betts et al. |
| 9,505,477 B2 | 11/2016 | Grace et al. |
| 9,507,562 B2 | 11/2016 | Bailey |
| 9,594,375 B2 | 3/2017 | Jopling |
| 9,596,839 B2 | 3/2017 | Bailey |
| 9,676,462 B2 | 6/2017 | Bernloehr et al. |
| 9,746,874 B2 | 8/2017 | Johnson et al. |
| 9,758,222 B2 | 9/2017 | Grace et al. |
| 9,784,825 B2 | 10/2017 | Brown et al. |
| 9,812,118 B2 | 11/2017 | Matson et al. |
| 9,836,129 B2 | 12/2017 | Clark |
| 9,947,309 B2 | 4/2018 | Stokes et al. |
| 10,012,731 B2 | 7/2018 | Pelin et al. |
| 10,025,312 B2 | 7/2018 | Langford-Wood |
| 10,061,025 B2 | 8/2018 | Kirmani |
| 10,107,908 B2 | 10/2018 | Betts et al. |
| 10,114,119 B2 | 10/2018 | Horner et al. |
| 10,114,470 B2 | 10/2018 | Clark |
| 10,203,403 B2 | 2/2019 | Fabrizio et al. |
| 10,241,200 B2 | 3/2019 | Sayer et al. |
| 10,247,823 B2 | 4/2019 | Brown et al. |
| 10,281,576 B2 | 5/2019 | Depasqua |
| 10,310,062 B2 | 6/2019 | Coleman et al. |
| 10,311,715 B2 | 6/2019 | Jopling |
| 10,324,175 B2 | 6/2019 | Laster |
| 10,325,582 B2 | 6/2019 | Antao et al. |
| 10,451,732 B2 | 10/2019 | Laster |
| 10,460,484 B2 | 10/2019 | Hovland et al. |
| 10,514,451 B2 | 12/2019 | Brown et al. |
| 10,545,226 B2 | 1/2020 | Wigh et al. |
| 10,545,235 B2 | 1/2020 | Pelin et al. |
| 10,684,368 B2 | 6/2020 | Pelin et al. |
| 10,723,428 B1 | 7/2020 | Vicari et al. |
| 10,890,660 B2 | 1/2021 | Wigh et al. |
| 11,059,556 B2 | 7/2021 | Ahlgren |
| 11,061,136 B2 | 7/2021 | Abbas et al. |
| 11,217,216 B2 | 1/2022 | Vance |
| 11,370,516 B2 | 6/2022 | Ridl |
| 11,525,907 B2 | 12/2022 | Wigh et al. |
| 11,536,820 B2 | 12/2022 | Wigh et al. |
| 2003/0191562 A1 | 10/2003 | Robertson et al. |
| 2003/0203684 A1 | 10/2003 | Healey |
| 2003/0214483 A1 | 11/2003 | Hammer et al. |
| 2003/0214880 A1 | 11/2003 | Rowe |
| 2005/0255761 A1 | 11/2005 | Bernloehr et al. |
| 2006/0116031 A1 | 6/2006 | Bernloehr et al. |
| 2009/0037040 A1 | 2/2009 | Salmon et al. |
| 2009/0227158 A1 | 9/2009 | Bernloehr et al. |
| 2012/0014220 A1 | 1/2012 | DePasqua |
| 2012/0015566 A1 | 1/2012 | Salmon |
| 2012/0060733 A1 | 3/2012 | Maki et al. |
| 2012/0204467 A1 | 8/2012 | Palmer et al. |
| 2012/0232719 A1 | 9/2012 | Salmon et al. |
| 2012/0299764 A1 | 11/2012 | Haneda et al. |
| 2013/0044569 A1 | 2/2013 | DePasqua |
| 2013/0215719 A1 | 8/2013 | Betts et al. |
| 2014/0203162 A1 | 7/2014 | Logan |
| 2014/0249698 A1 | 9/2014 | Salmon et al. |
| 2014/0269164 A1 | 9/2014 | Betts et al. |
| 2014/0269192 A1* | 9/2014 | Proctor ............... G01S 15/96 29/592.1 |
| 2014/0277851 A1 | 9/2014 | Grace et al. |
| 2014/0336854 A1 | 11/2014 | Salmon et al. |
| 2015/0016130 A1 | 1/2015 | Davis et al. |
| 2015/0063059 A1 | 3/2015 | DePasqua |
| 2015/0063060 A1 | 3/2015 | DePasqua |
| 2015/0151824 A1 | 6/2015 | Wireman |
| 2015/0346729 A1 | 12/2015 | Grace et al. |
| 2016/0016651 A1 | 1/2016 | Anderson et al. |
| 2016/0253150 A1 | 9/2016 | Williams et al. |
| 2017/0038460 A1 | 2/2017 | Clark |
| 2017/0285167 A1 | 10/2017 | Proctor et al. |
| 2017/0371039 A1 | 12/2017 | Clark et al. |
| 2018/0244361 A1 | 8/2018 | Laster |
| 2018/0288990 A1 | 10/2018 | Laster et al. |
| 2018/0329056 A1 | 11/2018 | Smith et al. |
| 2018/0365246 A1 | 12/2018 | Laster et al. |
| 2019/0064348 A1* | 2/2019 | Clark ............... G01S 15/96 |
| 2019/0072951 A1* | 3/2019 | Clark ............... B63B 34/05 |
| 2019/0088239 A1 | 3/2019 | Antao et al. |
| 2019/0176952 A1 | 6/2019 | Clark et al. |
| 2019/0176953 A1 | 6/2019 | Clark et al. |
| 2019/0219692 A1 | 7/2019 | Depasqua |
| 2019/0265354 A1 | 8/2019 | Antao |
| 2019/0331779 A1 | 10/2019 | Sandretto |
| 2020/0070943 A1 | 3/2020 | Clark et al. |
| 2020/0072953 A1 | 3/2020 | Wigh et al. |
| 2020/0103512 A1 | 4/2020 | Brown et al. |
| 2020/0256967 A1 | 8/2020 | Wigh et al. |
| 2020/0271782 A1 | 8/2020 | Rolt et al. |
| 2020/0401143 A1* | 12/2020 | Johnson ............... G01C 21/203 |
| 2021/0056944 A1 | 2/2021 | Vance |
| 2021/0141086 A1 | 5/2021 | Sloss et al. |
| 2021/0255627 A1 | 8/2021 | Snyder et al. |
| 2021/0278514 A1 | 9/2021 | Hughes |
| 2022/0018958 A1 | 1/2022 | Wagner |
| 2022/0108677 A1 | 4/2022 | Vance |
| 2022/0120882 A1 | 4/2022 | Coleman et al. |
| 2022/0381891 A1 | 12/2022 | Ruland et al. |

FOREIGN PATENT DOCUMENTS

| | | |
|---|---|---|
| CN | 109 471 116 A | 3/2019 |
| EP | 2 602 639 A1 | 6/2013 |
| EP | 1 891 461 B1 | 5/2014 |

(56) References Cited

FOREIGN PATENT DOCUMENTS

| | | |
|---|---|---|
| EP | 3170021 A1 | 5/2017 |
| EP | 3315993 A1 | 5/2018 |
| EP | 3171200 B1 | 6/2021 |
| GB | 2 421 312 A | 6/2006 |
| JP | 2020-134241 A | 8/2020 |
| KR | 10-2018-0096482 A | 8/2018 |
| WO | WO 8906368 A1 * | 7/1989 |
| WO | WO 95/28682 A1 | 10/1995 |
| WO | WO 2013/126761 A1 | 8/2013 |
| WO | WO 2014/144471 A1 | 9/2014 |
| WO | WO 2016/010619 A1 | 1/2016 |
| WO | WO 2019/129068 A1 | 7/2019 |
| WO | WO 2020/114107 A1 | 6/2020 |

OTHER PUBLICATIONS

"Bass Resource The Ultimate Bass Fishing Resource Guide: Bass Fishing Forums Trolling Motor Foot Pedal—Do You Mount to Deck?;" retrieved Dec. 8, 2017 from https://www.bassresource.com/bass-fishing-forums/topic/190825-trolling-motor-foot-pedal-do-you-mount-to-deck/.

Shepardson; "Google wins U.S. approval for new radar-based motion sensor;" Reuters; Jan. 1, 2019; retrieved Feb. 13, 2020 from https://www.reuters.com/article/us-google-sensor/google-wins-u-s-approval-for-radar-based-hand-motion-sensor-idUSKCN1OVISH.

Feldler; "Teaching With NYT Virtual Reality Across Subjects;" The New York Times; Mar. 28, 2019; retrieved Feb. 13, 2020 from https://www.nytimes.com/2019/03/28/learning/lesson-plans/teaching-with-nyt-virtual-reality-across-subjects.html.

Smolan et al; "The Click Effect;" New York Times VR; retrieved Feb. 13, 2020 from https://www.with.in/watch/CnVHWFg.

Porathe; "3-D Nautical Charts and Safe Navigation;" Department of Innovation, Design and Product Development; Doctoral Dissertation No. 27, Mälardalen University; Jan. 1, 2006; pp. 1-307 (XP055119720).

U.S. Appl. No. 16/791,335 entitled "Systems and Methods for Controlling Operations of Marine Vessels;" filed Feb. 14, 2020 in the name of Kristopher C. Snyder et al.

U.S. Appl. No. 17/371,192 entitled "Trolling Motor Foot Pedal Controlled Sonar Device ;" filed Jul. 9, 2021 in the name of Dustyn P. Pendergraft.

"LiveSweep ( Wired or Wireless Pedal) Mounting Hardware Included;" *Cornfield Crappie Gear*; retrieved Jul. 19, 2021 from https://www.cornfieldcrappiegear.com/product-page/livesweep-wired-pedal-mounting-hardware-included.

"Google Glass;" *Wikipedia*; retrieved Apr. 18, 2013 from http://en.wikipedia.org/wiki/Google_Glass.

"Navico set to GoFree"; May 1, 2012; retrieved Apr. 18, 2013 from http://www.marinebusiness.com.au/archive/navico-set-to-gofree.

Jun. 16, 2014 Search Report and Written Opinion issued in International Patent Application No. PCT/US2014/021133.

"Motor Guide Xi5 Wireless Foot Pedal;" retrieved Dec. 7, 2017 from http://www.motorguide.com/store/accessory/xi5-wireless-foot-pedal0.

"Magic Leap Quick Start Guide;" 2018; retrieved Feb. 13, 2020 from https://assets.ctfassets.net/b173eiperqoo/4H4PJgU9C0GySyie4QeuWE/c7ef230a10147e86173dd9250ce5b064/180606_QSG_277x190mm_PANTONE_v1.pdf.

*Cornfield Crappie Gear*; retrieved Jul. 19, 2021 from https://www.cornfieldcrappiegear.com/.

"The LiveScanner with True Scan Technology;" retrieved Mar. 24, 2022 from https://www.thelivescanner.com/.

Sealock; "Rite-Hite Turret Livescope Mount Review;" Dec. 17, 2020; retrieved Mar. 24, 2022 from https://www.wired2fish.com/electronics/rite-hite-turret-livescope-mount-review/.

*LSMount*; retrieved Mar. 24, 2022 from https://lsmounts.com.

* cited by examiner

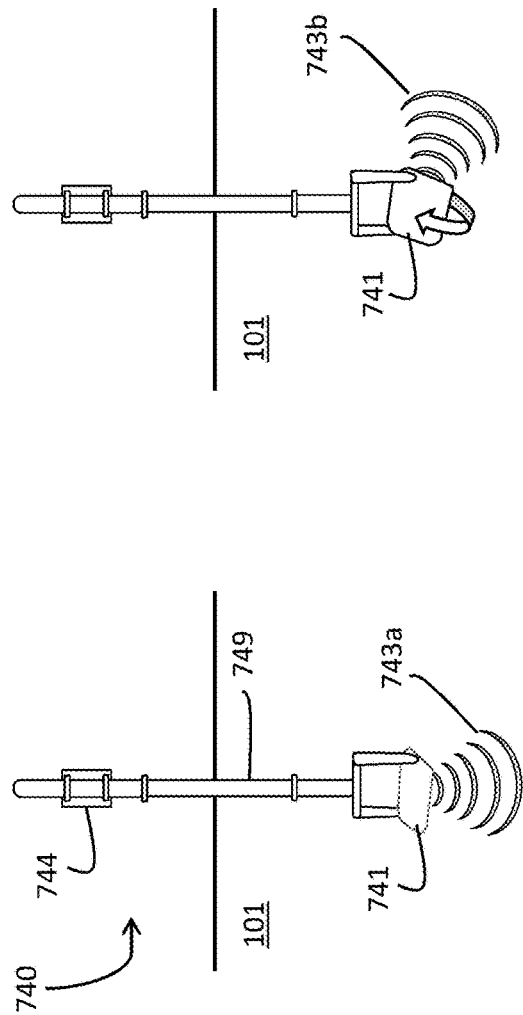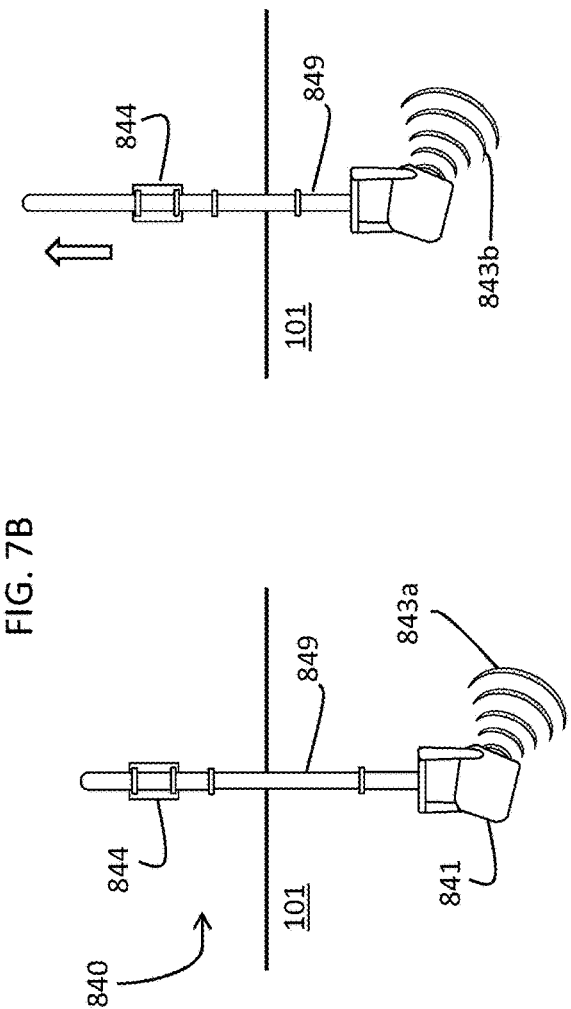

SONAR STEERING SYSTEMS AND ASSOCIATED METHODS

FIELD OF THE INVENTION

Embodiments of the present invention relate generally to sonar systems for a watercraft and, more particularly, to sonar steering systems and associated methods for adjusting the orientation and/or vertical position of the sonar assembly.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be presented on a display, giving the user a "picture" or image of the underwater environment.

Conventional sonar systems, however, may make it difficult for a user to understand and/or control the aim of the sonar coverage.

BRIEF SUMMARY OF THE INVENTION

In some conventional systems, sonar transducers exhibit a fixed orientation relative to a portion of the watercraft such that the facing direction of the transducers depends on the orientation of the watercraft. In such a manner, the sonar's aim may deviate from the direction desired by the user as the watercraft moves through the water, under its own power and/or due to the effect of current and wind. For example, a conventional sonar transducer fixedly coupled to a trolling motor assembly may deviate from a user's desired aim as the motor direction changes to propel the watercraft toward (or maintain the watercraft at) a given location. Where an angler is relying upon sonar returns to catch fish, departures from the orientation of the sonar expected or intended by the angler may result in fruitless casts directed at a location different than that shown by the sonar display. Moreover, when a user is undertaking other tasks such as simultaneously operating a trolling motor and casting, attempting to recognize and/or adjust the sonar orientation may be especially difficult.

In light of the above, some embodiments of the present teachings provide sonar systems with improved functionality and ease of use for an operator (e.g., an angler). For example, various embodiments provide a sonar steering system that may be configured to automatically adjust the directional coverage volume of the sonar system in a hands-free manner to allow the operator to focus on other tasks. Some embodiments of the present invention may be configured to adjust the directional coverage volume of the sonar transducers to maintain a target such as an area of interest (AOI) within the sonar display despite movement of the watercraft relative to the target. In some embodiments, the coverage volume may be automatically adjusted to maintain the aim of the sonar transducers at a target that is moving through the water such as a school of fish. In some related aspects, sonar-based systems and methods in accordance with the present teachings may additionally be configured to allow such a target to be selected and tracked, for example, by providing control signals to the motor assembly to propel the watercraft to follow the moving target.

In an example embodiment, a sonar system is provided, the system comprising a sonar assembly configured to attach to a watercraft having a motor assembly configured to propel the watercraft to travel along a direction of travel in a body of water. The sonar assembly comprises a shaft defining a first end and a second end and one or more sonar transducer elements attached to the second end of the shaft, wherein the one or more sonar transducer elements are configured to transmit one or more sonar beams into an underwater environment. The sonar assembly also comprises a sonar steering system configured to adjust an orientation of the one or more sonar transducer elements to a plurality of directions independent of the motor assembly and adjust a vertical position of the one or more sonar transducer elements. The sonar system also comprises a display, one or more processors, and a memory including computer program code configured to, when executed, cause the one or more processors to: cause the one or more sonar transducer elements to emit one or more sonar beams into the underwater environment; receive sonar return data from a coverage volume of the one or more sonar transducer elements; generate a sonar image of the coverage volume of the underwater environment based on the sonar return data; and cause the sonar steering system to adjust the coverage volume by at least one of (i) rotating the one or more sonar transducer elements about a longitudinal axis of the shaft, (ii) tilting the one or more sonar transducer elements, or (iii) adjusting the vertical position of the one or more sonar transducer elements within the underwater environment.

In some embodiments, the computer program code is further configured to, when executed, cause the one or more processors to operate the sonar steering system to adjust at least one of the orientation or the vertical position of the one or more sonar transducer elements to maintain a target within the coverage volume during movement of the watercraft and the target relative to one another. In some related embodiments, the target comprises an area of interest. By way of example, the area of interest may be identified by at least one of a geo-positional location and a compass heading.

In some embodiments, the target comprises an object moving within the underwater environment. In some such aspects, the computer program code may be further configured to, when executed, cause the one or more processors to operate the motor assembly to propel the watercraft relative to the moving object. Additionally or alternatively, in some aspect, the computer program code may be further configured to, when executed, cause the one or more processors to identify the target among a plurality of objects moving within the underwater environment. In some embodiments, the computer program code may be further configured to, when executed, cause the one or more processors to receive input by a user selecting the target from the plurality of objects moving within the underwater environment.

As noted above, in some embodiments, the computer program code may be further configured to, when executed, cause the one or more processors to operate the sonar steering system to adjust at least one of the orientation or the vertical position of the one or more sonar transducer elements to maintain a target within the coverage volume during movement of the watercraft and the target relative to one another. In some embodiments, the computer program code may be further configured to, when executed, cause the one or more processors to cause the sonar steering system to adjust the coverage volume based on an upcoming or a current direction and speed of the watercraft. Additionally or alternatively, in some embodiments, the computer program code may be further configured to, when executed, cause the one or more processors to: determine motor assembly instructions to provide to the motor assembly for propelling the watercraft according to a motor direction and a motor speed; determine sonar steering system instructions to provide to the sonar steering system for adjusting the coverage volume based on the motor assembly instructions; and provide the motor assembly instructions to the motor assembly and the sonar steering system instructions to the sonar steering system to cause the motor assembly and the sonar steering system to work together to track the target.

In some embodiments, the computer program code is further configured to, when executed, cause the one or more processors to: cause the sonar steering system to adjust the vertical position of the one or more sonar transducer elements in response to detection of a depth of an object in the underwater environment.

In some embodiments, the computer program code is further configured to, when executed, cause the one or more processors to: receive a command from a user to cause the sonar steering system to rotate the one or more sonar transducer elements about the longitudinal axis. For example, in some embodiments, the command from the user may be input via at least one of the display and a remote control or is based on at least one of a body gesture detection, an orientation sensor associated with the user, and a voice command.

In another example embodiment, a method for operating a sonar system is provided. The method comprises causing one or more sonar transducer elements attached to a shaft of a sonar assembly to emit one or more sonar beams into an underwater environment, wherein the sonar assembly is attached to a watercraft having a motor assembly configured to propel the watercraft to travel along a direction of travel in a body of water. The method also comprises receiving sonar return data from a coverage volume of the one or more sonar transducer elements and displaying, on a display, a sonar image of the coverage volume based on the sonar return data. The method also comprises causing, by one or more processors in operable communication with a sonar steering system, the sonar steering system to adjust the coverage volume by at least one of (i) rotating the one or more sonar transducer elements about a longitudinal axis of the shaft, (ii) tilting the one or more sonar transducer elements, or (iii) adjusting a vertical position of the one or more sonar transducer elements within the underwater environment, wherein the sonar steering system is configured to: adjust an orientation of the one or more sonar transducer elements to a plurality of directions independent of the motor assembly, and adjust the vertical position of the one or more sonar transducer elements.

In some embodiments, the coverage volume of the one or more sonar transducer elements is adjusted to maintain a target within the coverage volume during movement of the watercraft and the target relative to one another.

In some embodiments, the vertical position of the one or more sonar transducer elements may be adjusted in response to detection of a depth of an object in the underwater environment.

In some embodiments, the method may further comprise receiving a command from a user to cause the sonar steering system to rotate the one or more sonar transducer elements about the longitudinal axis.

In another example embodiment, a sonar assembly configured to attach to a watercraft having a motor assembly configured to propel the watercraft to travel along a direction of travel in a body of water is provided. The sonar assembly comprises a shaft defining a first end and a second end and one or more sonar transducer elements attached to the second end of the shaft, wherein the one or more sonar transducer elements are configured to transmit one or more sonar beams into an underwater environment. The sonar assembly also comprises a sonar steering system configured to adjust an orientation of the one or more sonar transducer elements to a plurality of directions independent of the motor assembly, and adjust a vertical position of the one or more sonar transducer elements. The sonar assembly also comprises one or more processors and a memory including computer program code configured to, when executed, cause the one or more processors to: cause the one or more sonar transducer elements to emit one or more sonar beams into the underwater environment; receive sonar return data from a coverage volume of the one or more sonar transducer elements; generate a sonar image of the coverage volume of the underwater environment based on the sonar return data; and cause the sonar steering system to adjust the coverage volume by at least one of (i) rotating the one or more sonar transducer elements about a longitudinal axis of the shaft, (ii) tilting the one or more sonar transducer elements, or (iii) adjusting the vertical position of the one or more sonar transducer elements within the underwater environment.

In some embodiments, the coverage volume of the one or more sonar transducer elements is adjusted to maintain a target within the coverage volume during movement of the watercraft and the target relative to one another.

Additional example embodiments of the present invention include methods, systems, and computer program products associated with various embodiments described herein.

BRIEF DESCRIPTION OF THE DRAWINGS

Figure 1:
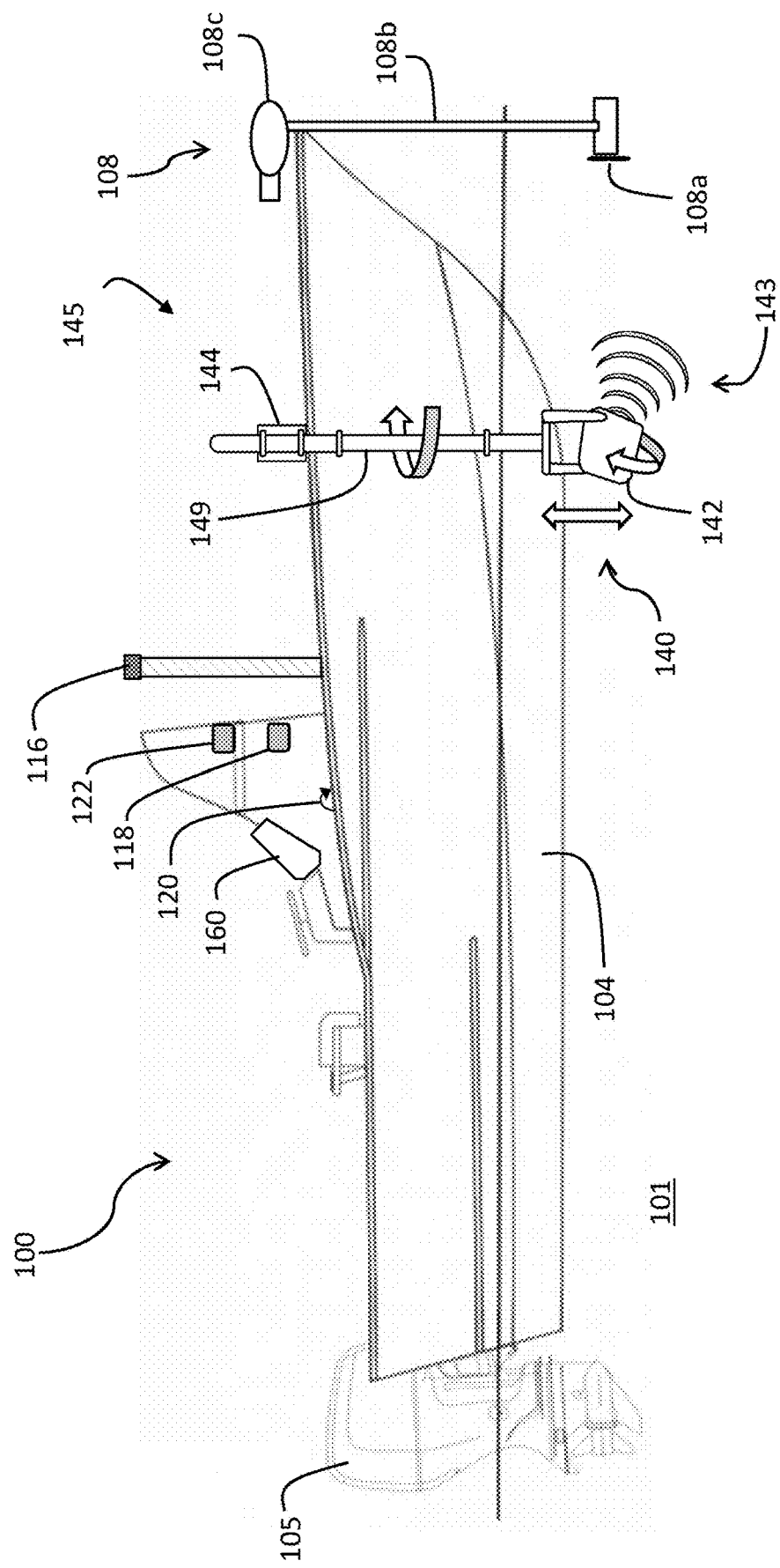
Figure 2A:
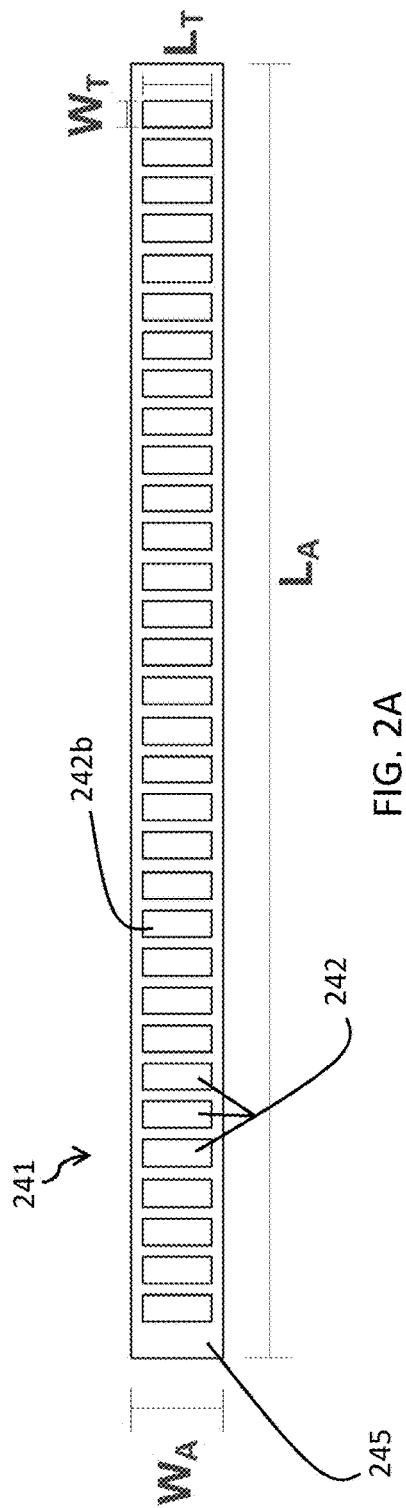
Figure 2B:
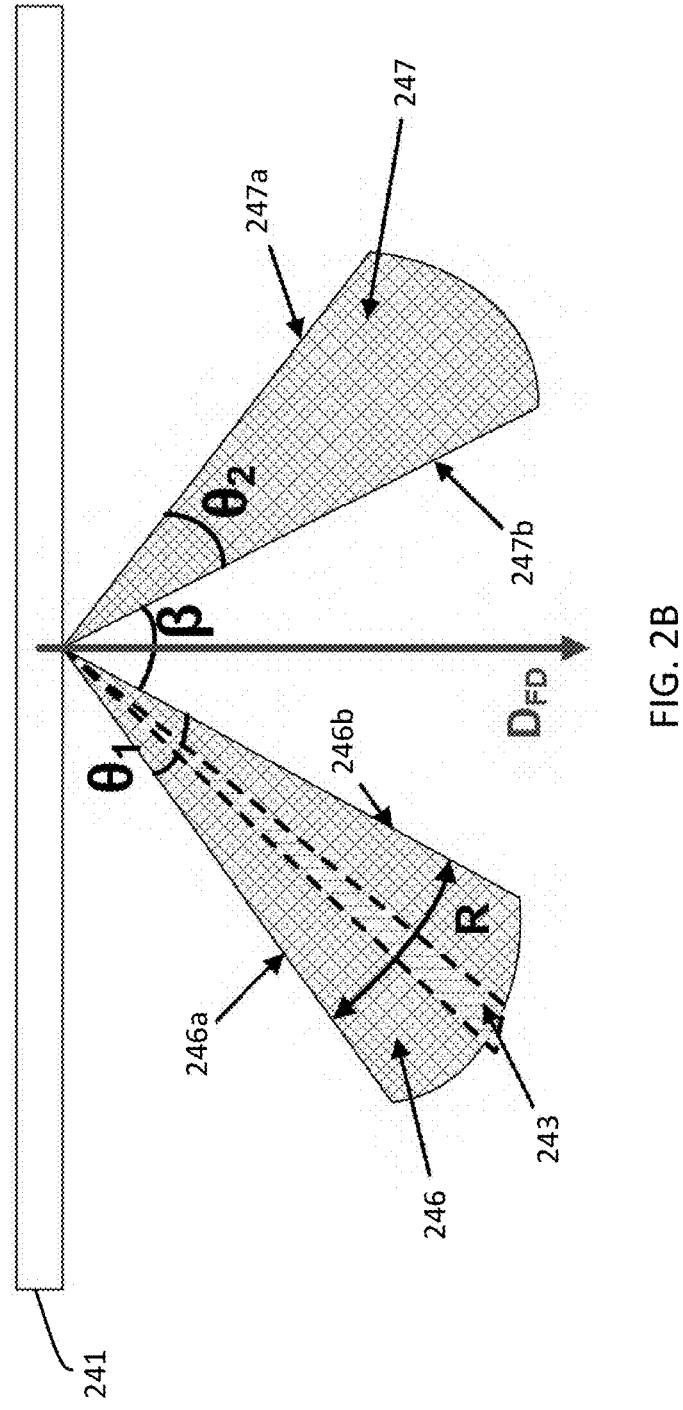
Figure 2C:
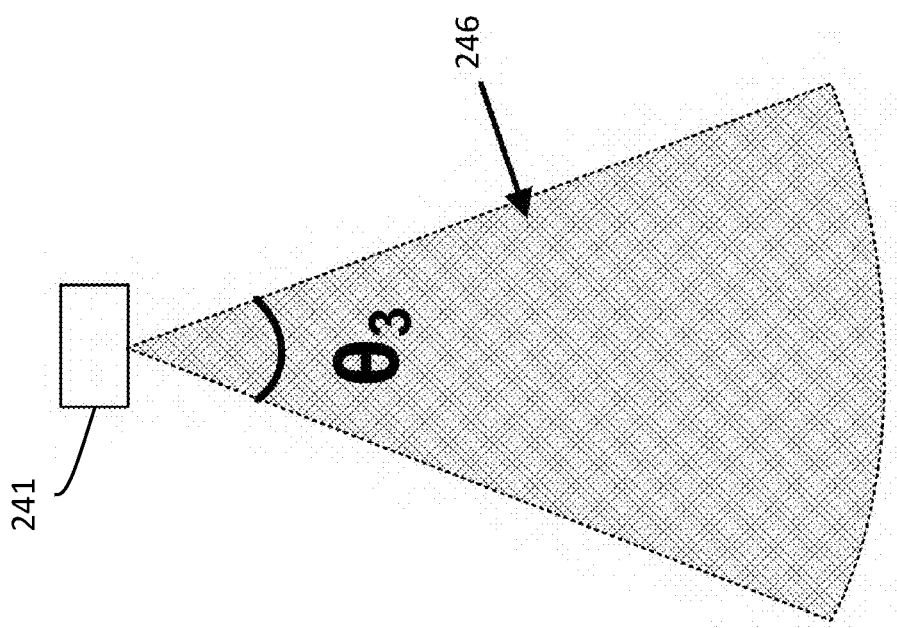
Figure 3:
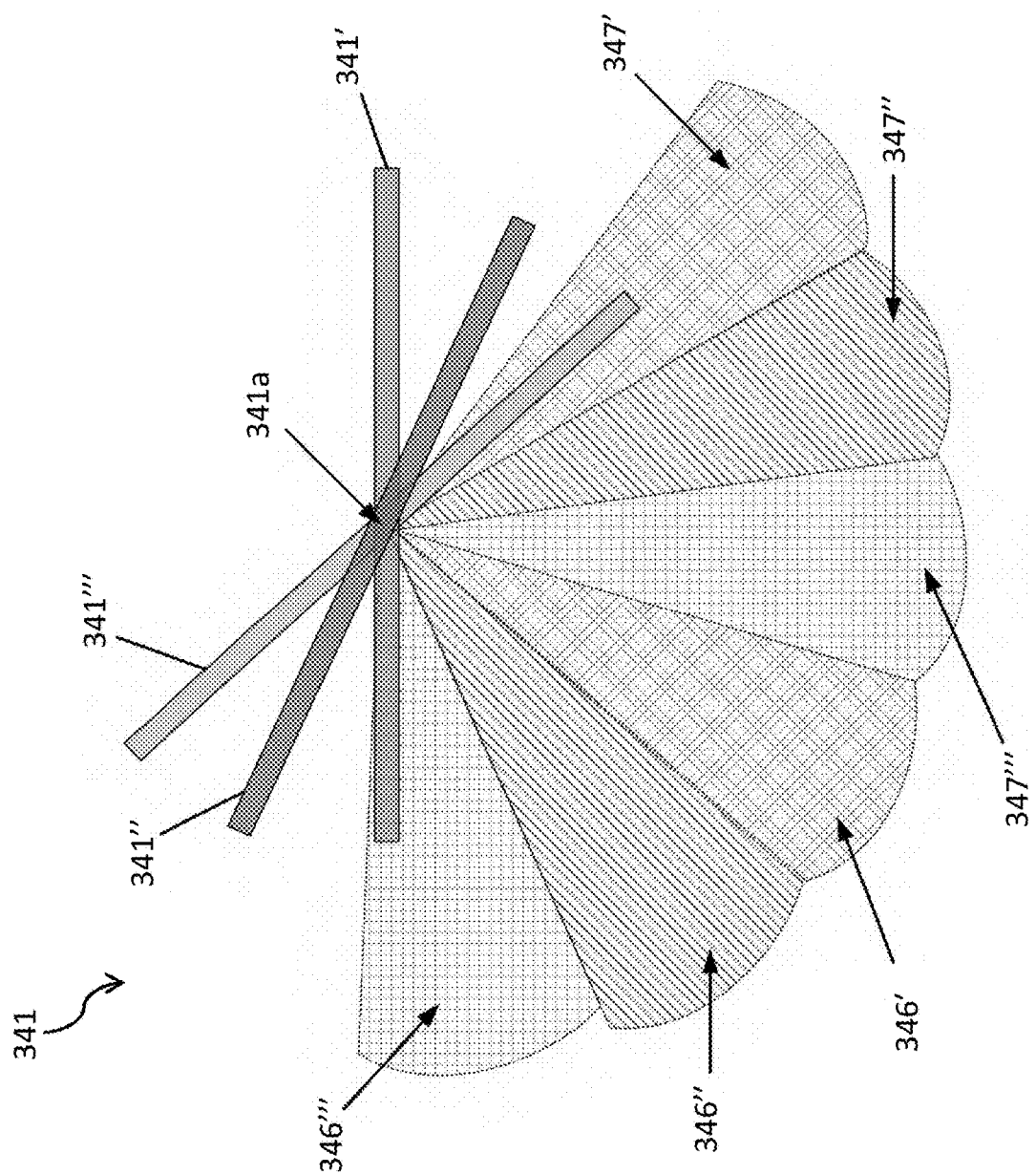
Figure 4:
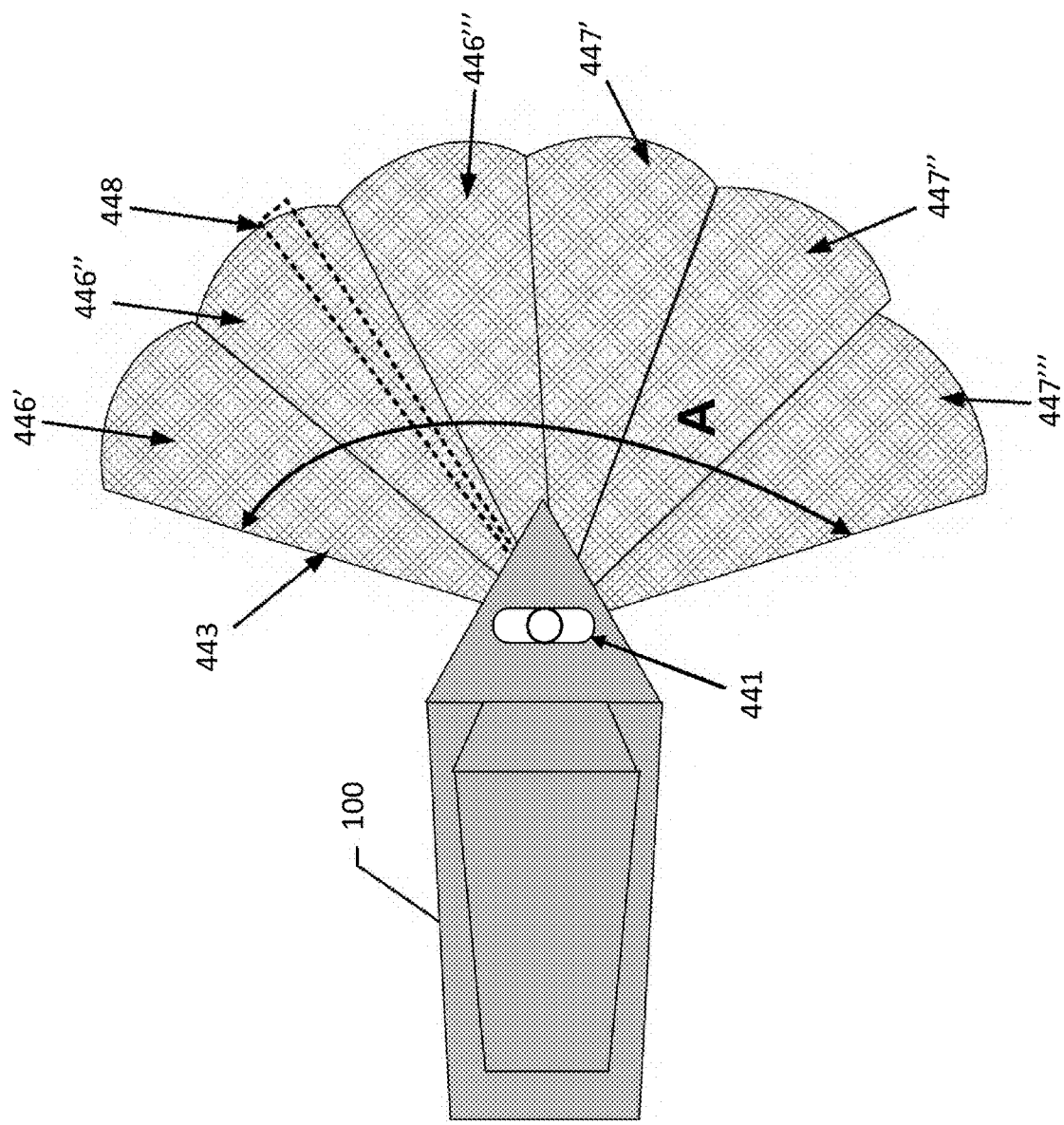
Figure 5:
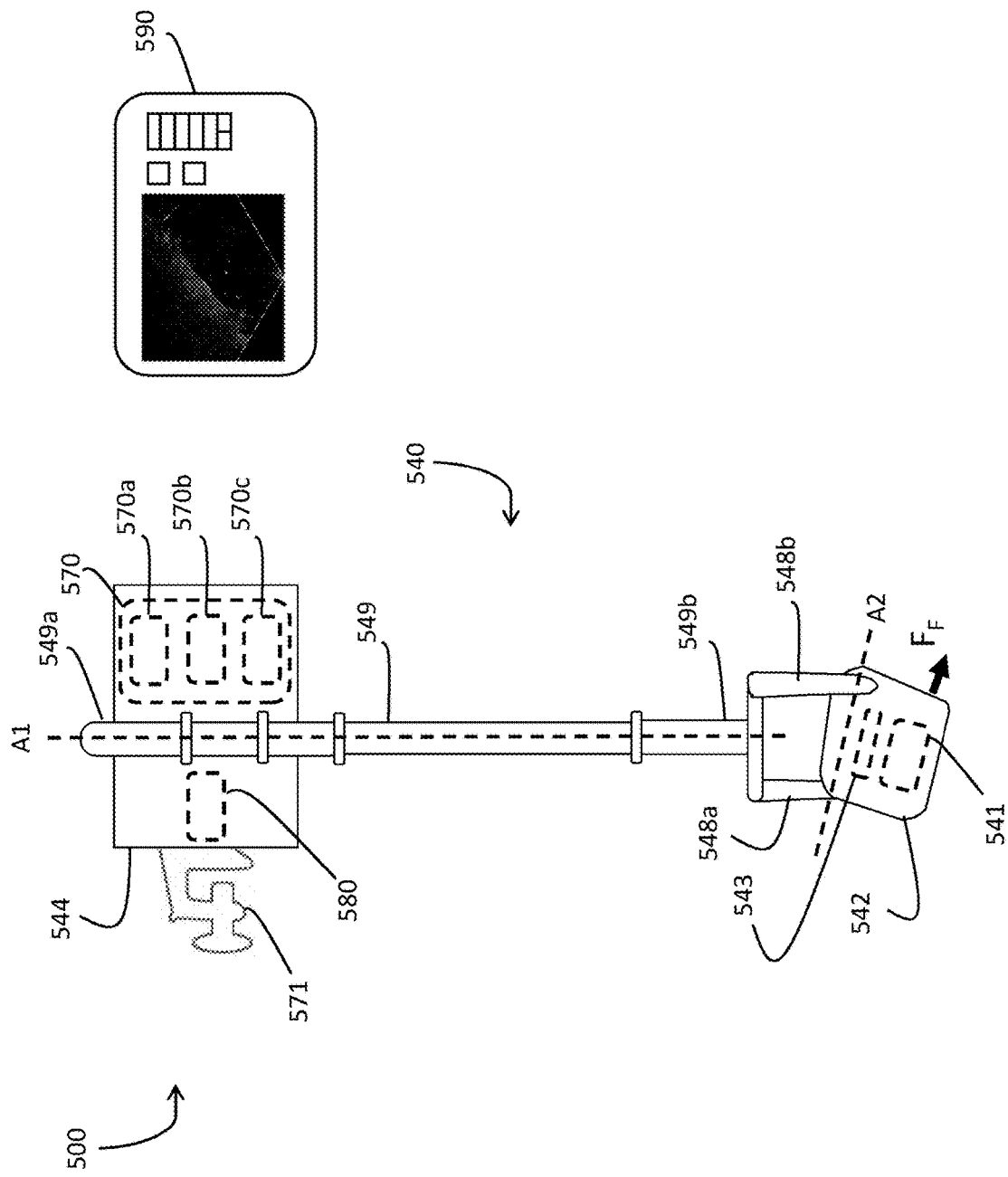
Figure 9B:
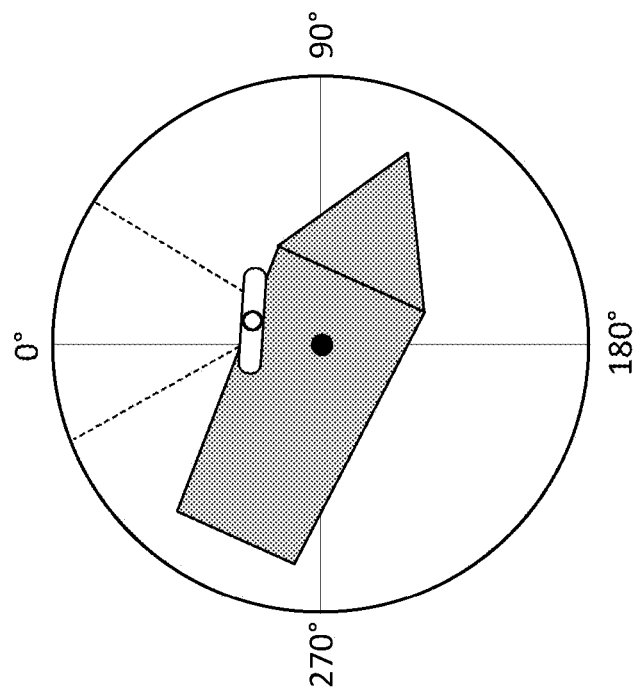
Figure 9A:
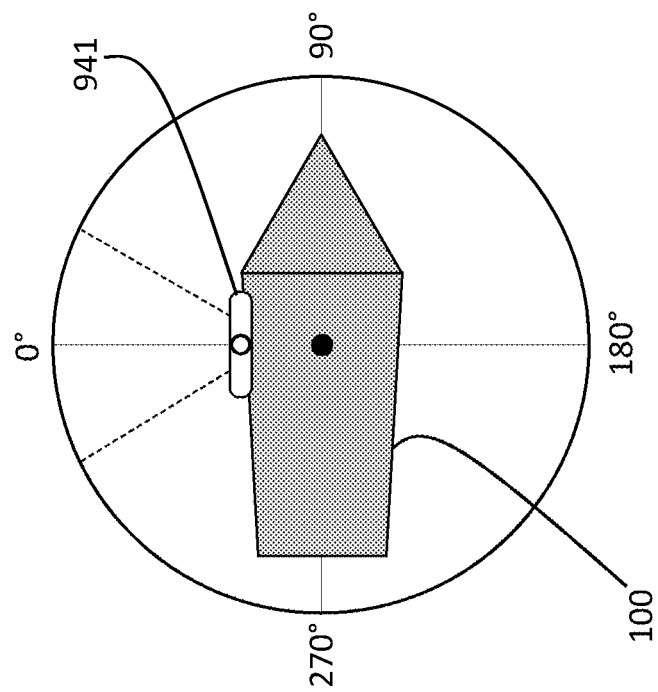
Figure 10B:
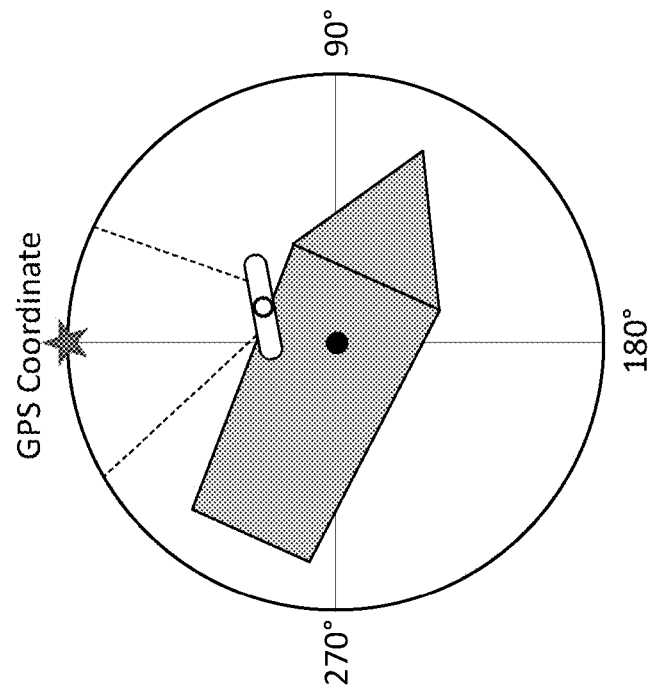
Figure 10A:
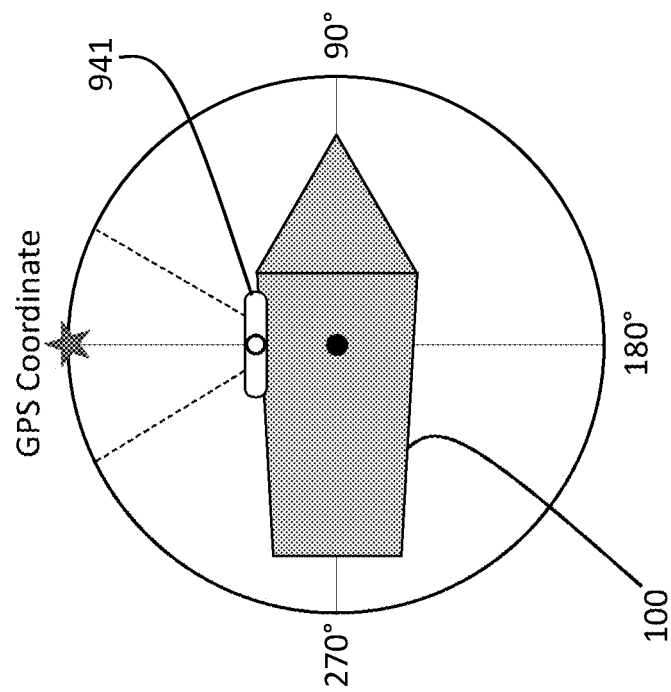
Figure 11:
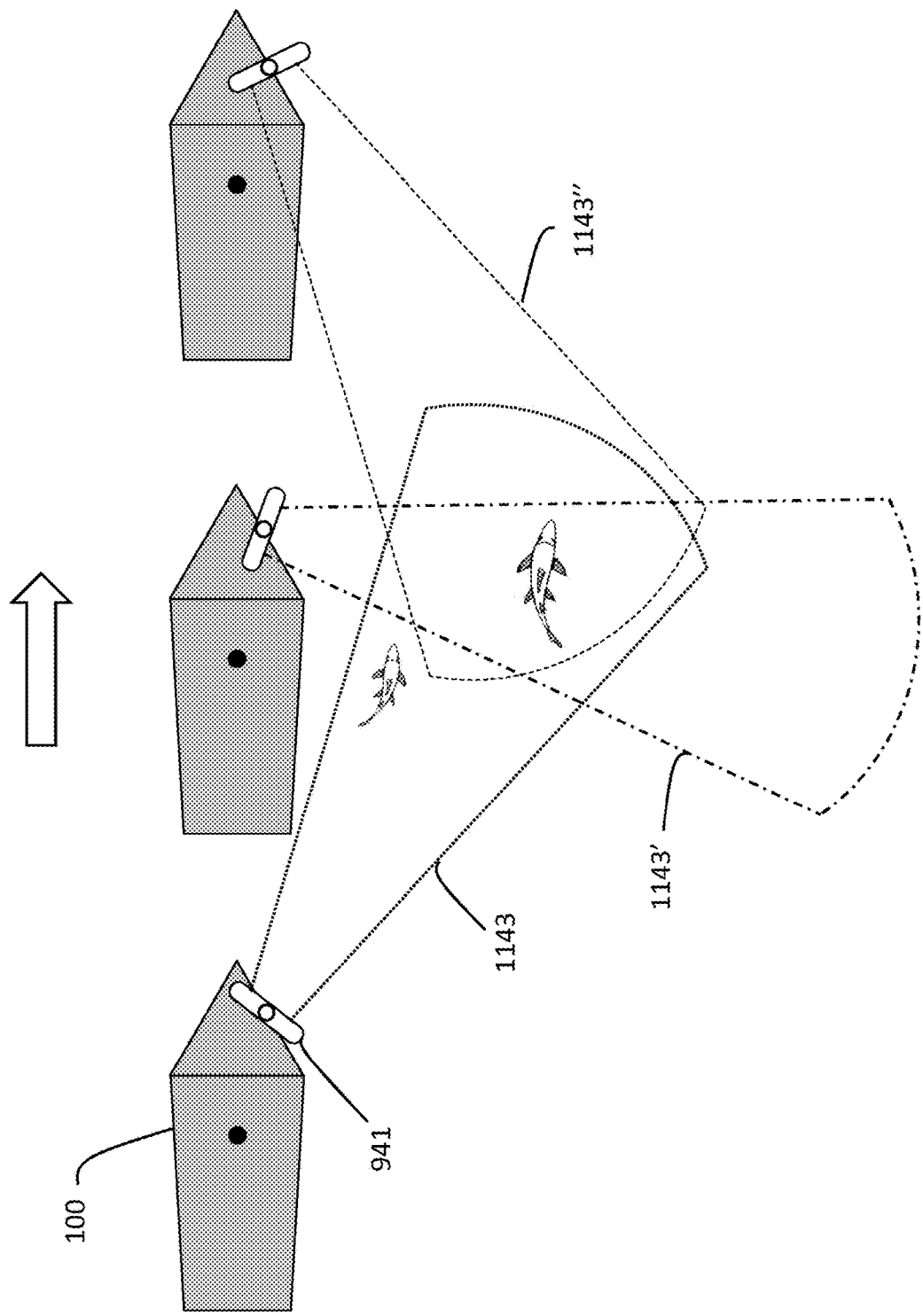
Figure 12:
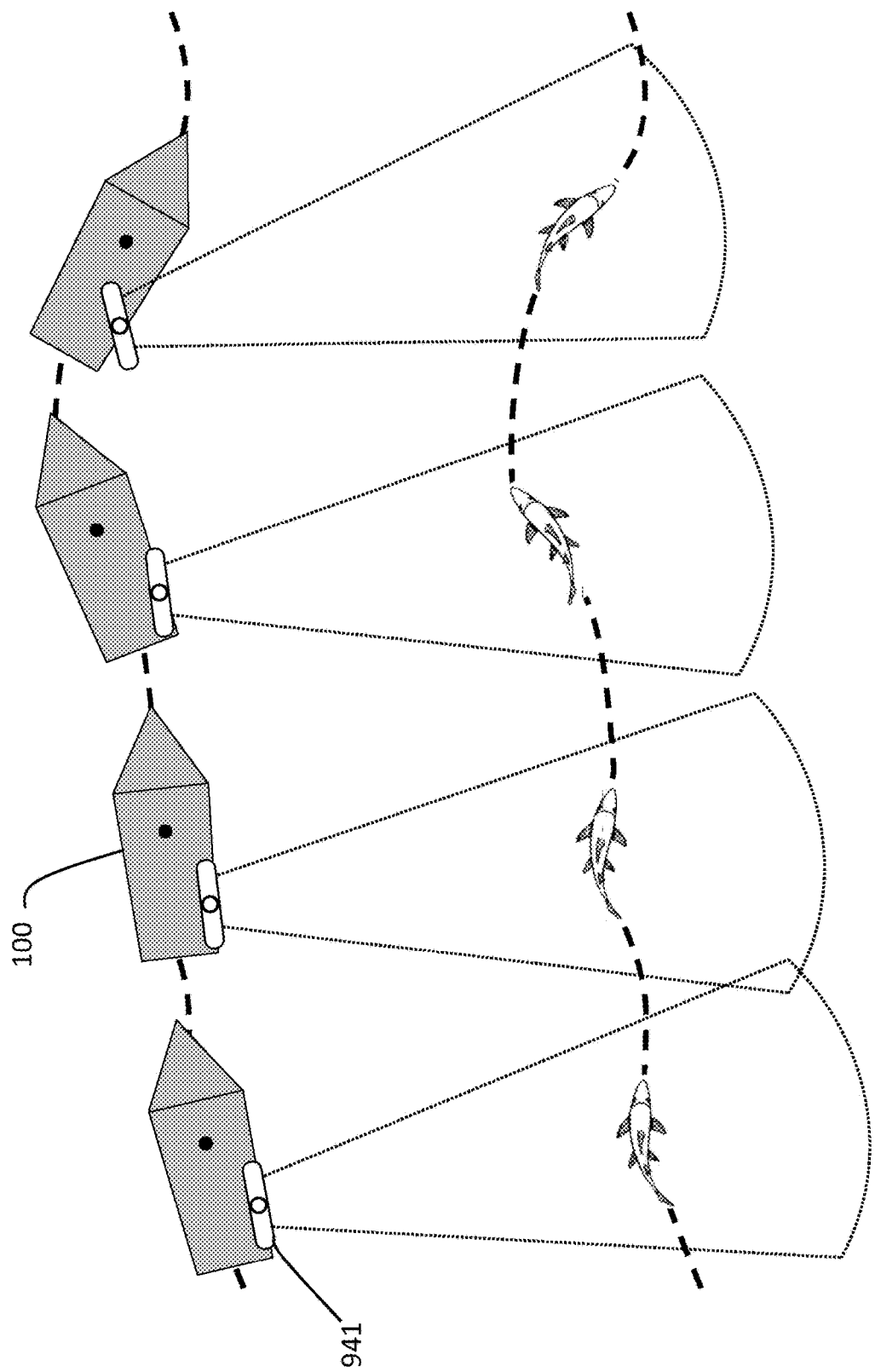
Figure 13:
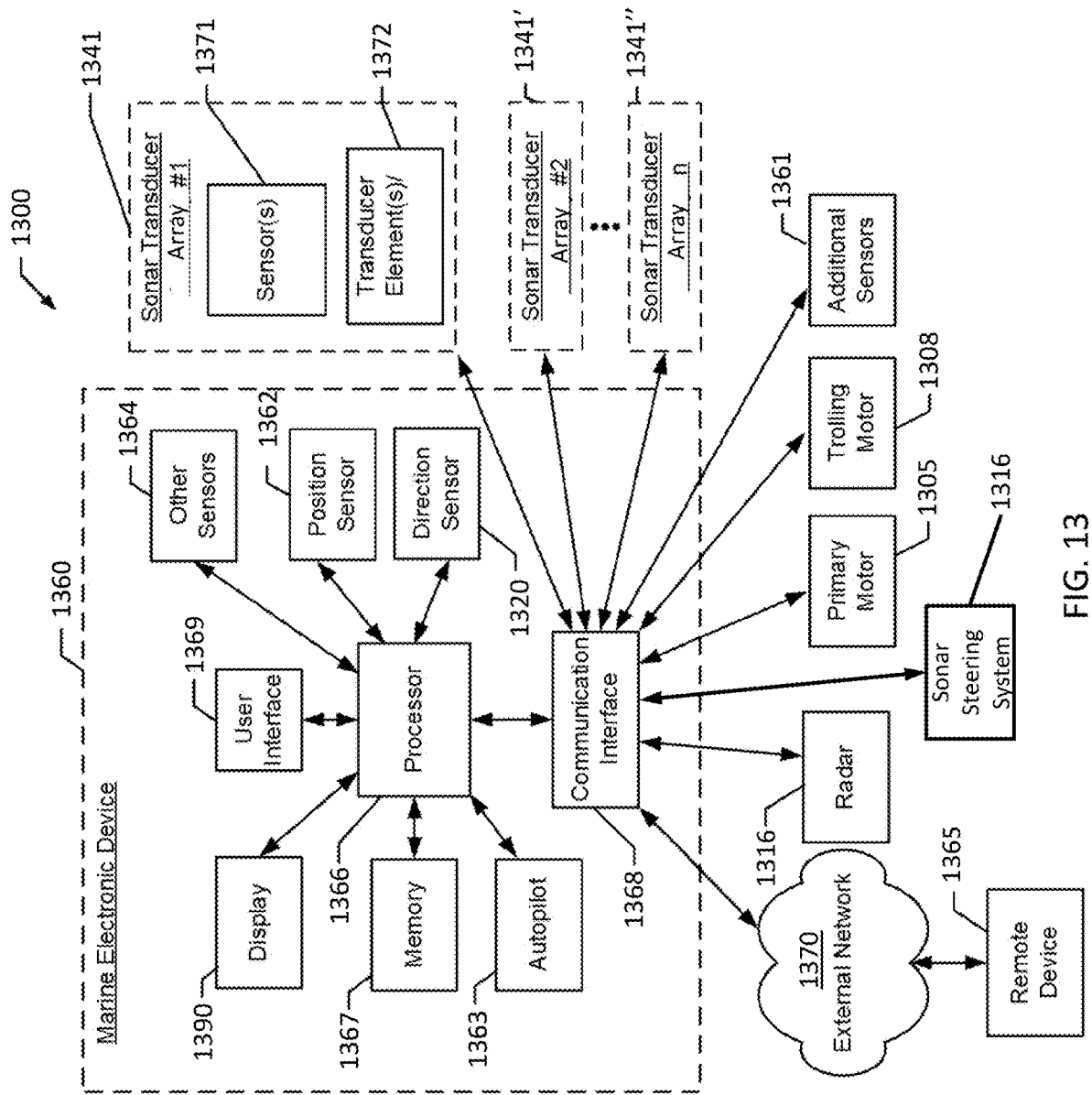
Figure 14:
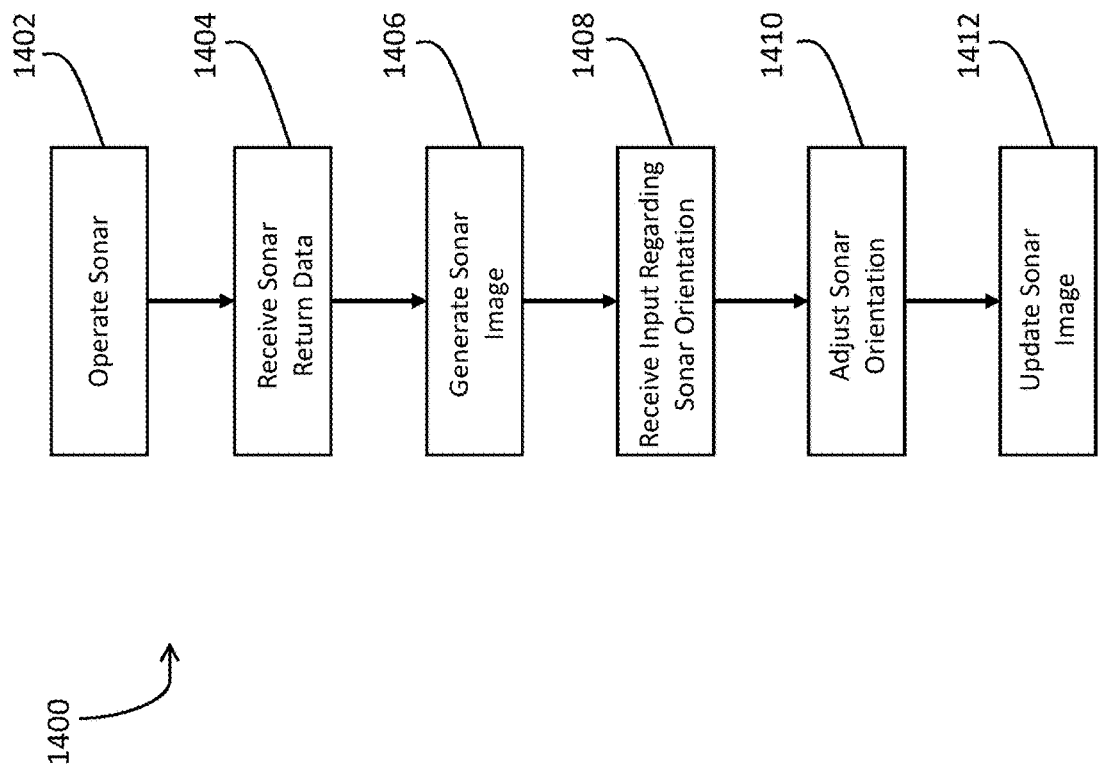
Figure 15:
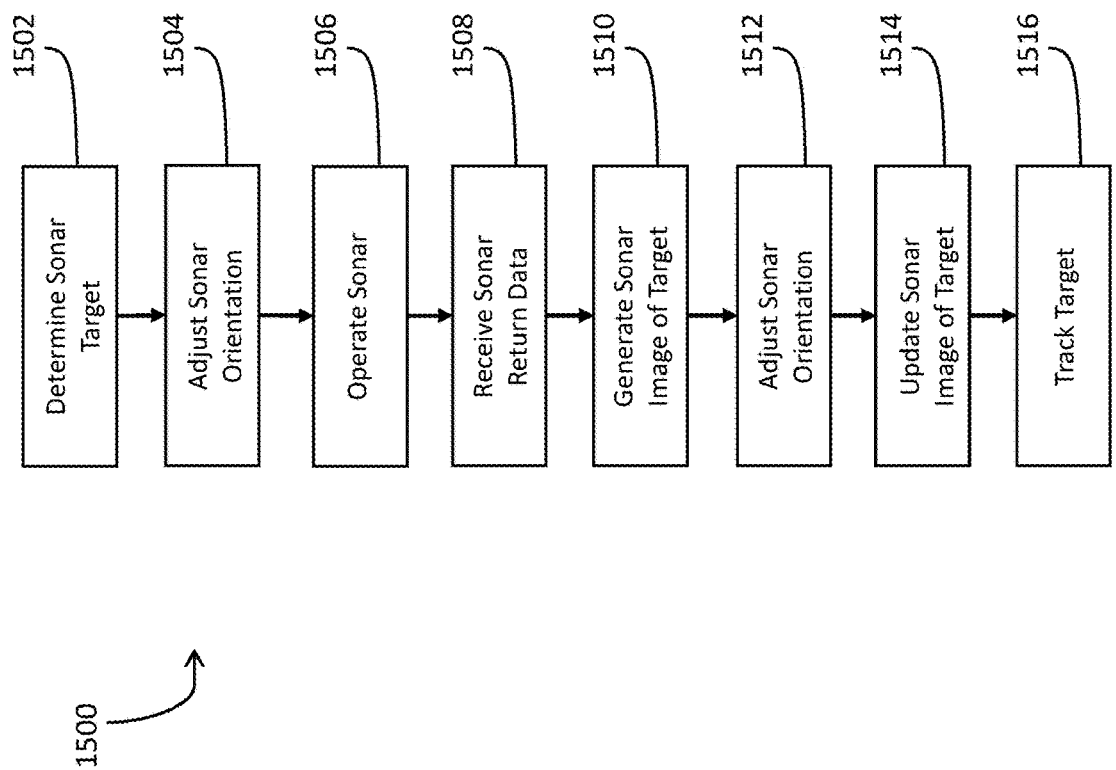

Having thus described the invention in general terms, reference will now be made to the accompanying drawings, which are not necessarily drawn to scale, and wherein:

FIG. 1 illustrates an example watercraft including various marine devices, in accordance with some embodiments discussed herein;

FIG. 2A illustrates an example array of transducer elements, in accordance with some embodiments discussed herein;

FIG. 2B illustrates a side view of the array of transducer elements shown in FIG. 2A, wherein an example first range of angles and an example second range of angles for beamformed sonar return beams are illustrated, in accordance with some embodiments discussed herein;

FIG. 2C illustrates an end view of the array of transducer elements shown in FIG. 2B along with illustrated ranges of angles of beamformed sonar return beams, in accordance with some embodiments discussed herein;

FIG. 3 illustrates three example arrays arranged to provide continuous sonar coverage utilizing beamformed sonar return beams, in accordance with some embodiments discussed herein;

FIG. 4 illustrates a schematic top plan view of a watercraft with an example transducer assembly utilizing three arrays, wherein the transducer assembly is mounted generally horizontally to provide sonar coverage in the port-to-starboard direction in front of the watercraft, in accordance with some embodiments discussed herein;

FIG. 5 illustrates an example sonar system, in accordance with some embodiments discussed herein;

FIGS. 6A-D is a schematic depiction of adjusting the coverage volume of a sonar system, in accordance with some embodiments discussed herein;

FIGS. 7A-B is a schematic depiction of adjusting the coverage volume of a sonar system, in accordance with some embodiments discussed herein;

FIGS. 8A-B is a schematic depiction of adjusting the coverage volume of a sonar system, in accordance with some embodiments discussed herein;

FIGS. 9A-B is a schematic depiction of utilizing a sonar system to maintain a target within the coverage volume in accordance with some embodiments discussed herein;

FIGS. 10A-B is a schematic depiction of utilizing a sonar system to maintain a target within the coverage volume in accordance with some embodiments discussed herein;

FIG. 11 is a schematic depiction of utilizing a sonar system to maintain a target within the coverage volume in accordance with some embodiments discussed herein;

FIG. 12 is a schematic depiction of utilizing a sonar system to maintain a target within the coverage volume in accordance with some embodiments discussed herein;

FIG. 13 is a block diagram of an example system with various electronic devices, marine devices, and secondary devices shown, in accordance with some embodiments discussed herein;

FIG. 14 illustrates a flowchart of an example method for operating a sonar system, in accordance with some embodiments discussed herein; and FIG. 15 illustrates a flowchart of an example method for operating a sonar system, in accordance with some embodiments discussed herein.

DETAILED DESCRIPTION

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 (e.g., a vessel) is configured to traverse a marine environment, e.g. body of water 101, under the propulsion of one or more motor assemblies. The watercraft 100 may be a surface watercraft, a submersible watercraft, or any other implementation known to those skilled in the art. Depending on the configuration, the watercraft 100 may include a primary motor assembly 105, which may include a main propulsion motor such as an outboard or inboard motor. Additionally or alternatively, the watercraft 100 may include a trolling motor assembly 108 configured to propel the watercraft 100 or maintain a position within the body of water. As will be appreciated by a person skilled in the art, each of the primary motor assembly 105 and trolling motor assembly 108 is configured to provide a directional thrust to the watercraft 100 by rotating at least a portion of the motor assemblies as the propeller spins. As depicted, the trolling motor assembly 108 may comprise a propeller 108a coupled to a main housing 108c via a shaft 108b. The direction of thrust of the propeller 108a may be controlled manually via user actuation of a handle extending from the main housing 108c to rotate the shaft 108b (and thus the propeller 108a) and/or electronically, for example, by a trolling motor steering assembly contained within the housing 108c for rotating the shaft 108b. Likewise, the depicted outboard primary motor assembly 105 may rotate to change the direction of thrust as is known in the art, while a rudder (not shown) may be rotated to steer the watercraft 100 when utilizing an inboard primary motor assembly. Further, electronically-controlled motor assemblies can, in connection with a location sensor such as a global position system (GPS) sensor, allow for autonomous operation of the motor assemblies (e.g., to automatically follow a pre-defined path as in autopilot) and/or deploy a "virtual anchor" that automatically adjusts the direction and force of the motor assemblies to maintain the watercraft 100 in a substantially fixed position.

As depicted in FIG. 1, the watercraft 100 includes an example sonar assembly 140 in accordance with various aspects of the present teachings generally comprising one or more sonar transducer elements 142 (e.g., an array of transducers) coupled to a main housing 144 via a shaft 149. Though various embodiments described herein use the term sonar transducer "array", such a term is for explanatory purposes and it is readily understood that any sonar transducer arrangements may be substituted and/or added. In this regard, one or more sonar transducer elements (e.g., a conical transducer, a linear transducer, a rectangular transducer, etc.) and/or various types of sonar transducer arrays (e.g., beamforming, interferometry, etc.) may be utilized.

In use, the sonar assembly 140 may be coupled to the watercraft 100 such that the one or more sonar transducer elements 142 may be disposed within the body of water 101. Generally, the sonar transducer element(s) 142 are configured to transmit at least one sonar beam 143 into the body of water 101 and receive reflected sonar returns from objects (e.g., fish, structure, bottom surface of the water, etc.) that the beam(s) 143 encounter in the underwater environment. One or more processors associated with sonar assembly 140 may determine from the sonar returns (e.g., based on the known speed of sound) the distance to and/or location of the underwater objects and may present such objects on a display to provide the user a "picture" or image of the underwater environment.

As discussed below, the one or more sonar transducer elements 142 may be configured to emit sonar beams and receive sonar returns to generally provide a coverage volume extending outwardly from an emitting face of the sonar assembly 140. By way of example, each of the one or more sonar transducer elements 142 may receive sonar returns within a cone extending from the emitting face such that sonar beam slices from the one or more sonar transducer elements 142 together extend across an overall sonar beam angle, thereby defining a coverage volume extending radially outward from the emitting face of the one or more sonar transducer elements 142. Unlike a conventional system in which the facing direction of sonar transducers depends on the orientation of the watercraft or the orientation of the portion of the watercraft to which the transducers are fixed (e.g., the orientation of a sonar transducer coupled to the trolling motor 108 changes as the trolling motor rotates to propel the watercraft in a desired direction), embodiments of sonar assemblies 140 in accordance with the present teachings enable the independent, electronic control of the orientation of the one or more sonar transducer elements 142. As discussed below and schematically depicted in FIG. 1, for example, the sonar assembly 140 includes a sonar steering system 145 may be configured, under the direction of one or more processors, to adjust the coverage volume by rotating the one or more sonar transducer elements 142 about the longitudinal axis of the shaft 149, tilting the one or more sonar transducer elements 142 so as to angle the orientation of the one or more sonar transducer elements 142 toward or away from the water surface, and/or adjusting a vertical position (e.g., depth) of the one or more sonar transducer elements 142 below the water surface, such as by increasing or decreasing the length of the shaft 149 within the water.

The sonar assembly 140 may be mounted in various positions and to various portions of the watercraft 100 and/or equipment associated with the watercraft 100. For example, the sonar assembly 140 may be removably mounted on the side of the watercraft 100, such as depicted in FIG. 1, or other suitable locations via a detachable coupling (e.g., via a mounting bracket, clip, etc.) for attaching the main housing 144 to a portion of the watercraft 100 (e.g., the transom). Alternatively, the sonar assembly 140 may be permanently coupled to the watercraft 101 (e.g., extending through the hull into the underwater environment, mounted to the transom, etc.).

As noted above, the sonar assembly 140 may include a display 160 to display to the user various data, such as a sonar image of the underwater environment. Such a sonar image may, for example, be based on the distance to and/or location of underwater objects as determined from the sonar return data. The display 160 may be associated with (e.g., coupled to) the main housing 144, may be disposed at a variety of other locations within the watercraft 100, and/or may be held by the user (e.g., as a wireless display). For example, as depicted in FIG. 1, the sonar display 160 is positioned proximate the helm (e.g., steering wheel) of the watercraft—although other places on the watercraft 100 are contemplated. In some example aspects, a user's mobile device may be configured to display the sonar data.

The watercraft 100 may also comprise other components such as may be utilized by a user to interact with, view, or otherwise control various aspects of the various sonar systems described herein or other one or more marine control devices. For example, the watercraft 100 of FIG. 1 comprises a radar 116, which is mounted at an elevated position (although other positions relative to the watercraft are also contemplated). The watercraft 100 also comprises an AIS transceiver 118, a direction sensor 120, and a camera 122, and these components are each positioned at or near the helm (although other positions relative to the watercraft are also contemplated). Other example devices on the watercraft 100 include a temperature sensor that may be positioned so that it will rest within or outside of the body of water 101, a wind sensor, one or more speakers, and various vessel devices/features (e.g., doors, bilge pump, fuel tank, etc.), among other things. Additionally, one or more sensors may be associated with marine devices; for example, a sensor may be provided to detect the position of the primary motor 105, the trolling motor 108, or the rudder 110. It will be appreciated that control and/or display of these components may be integrated into the display 160 or may be controlled via one or more other electronic devices.

Each of the one or more sonar transducers 142 can be any known or hereafter sonar transducer known in the art or hereafter developed and modified in accordance with the present teachings. Such examples include transducers suitable for use in downscan or sidescan sonar imaging and phased arrays to generate "live" displays, though other transducer assembly configurations can also be used to form sonar imagery. That is, embodiments of the present invention generally provide a sonar coverage volume extending outwardly from an emitting face of the sonar assembly 140 but are not necessarily meant to be limited to a specific transducer assembly.

In some example embodiments, systems and methods in accordance with the present teachings utilize sonar transducer assemblies that provide for generating near real-time (e.g., "live") sonar imagery. In this regard, in some embodiments, the entire sonar image may be continuously updated all at once (e.g., as opposed to building up historical slices of sonar data as is typical of conventional sonar images). Examples of such sonar transducer elements to form live sonar imagery are depicted in FIGS. 2A-C.

FIGS. 2A-C illustrate a plurality of sonar transducer elements 242 forming an example array 241 that may be utilized with various embodiments of the present invention. In some embodiments, the transducer array 241 may include a plurality of transducer elements 242 arranged in a line and electrically connected relative to each other. For example, the transducer elements 242 may be individually positioned on a printed circuit board (PCB). The PCB may mechanically support and electrically connect the electronic components, including the transducer elements using conductive tracks (e.g. traces), pads, and other features. The conductive tracks may comprise sets of traces; for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals. Although FIGS. 2A-C illustrate a linear array with transducer elements of a certain shape, different types of arrays (or sub-arrays), transducer elements, spacing, shapes, etc. may be utilized with various embodiments of the present invention. For example, more or less arrays or elements within the arrays may be used, different transducer element configurations may be used, multiple sonar transducer assemblies can be used, etc.

In the illustrated embodiment shown in FIG. 2A, the transducer array 241 includes an emitting face 245 with a length $L_A$ and a width $W_A$, where the length is greater than the width. Within the array 241, each transducer element 242 defines an emitting face 242b with a length $L_T$ and a width $W_T$, where the length is greater than the width. The length of each transducer element 242 is perpendicular to the length of the emitting face 245. Each transducer element 242 is spaced at a predetermined distance from an adjacent transducer element, which may be designed based on desired operating characteristics of the array 241, such as described herein.

In some embodiments, the array 241 of transducer elements 242 is configured to operate to transmit one or more sonar beams into the underwater environment. Depending on the configuration and desired operation, different transmission types of sonar beams can occur. For example, in some embodiments, the array 241 may transmit sonar beams according to a frequency sweep (e.g., chirp sonar) so as to provide sonar beams into the underwater environment. In some embodiments, the array 241 may be operated to frequency steer transmitted sonar beams into various volumes of the underwater environment. In some embodiments, the array 241 may be operated to cause a broadband transmit sonar beam to be sent into the underwater environment. Depending on the frequency used and phase shift applied between transducer elements, different volumes of the underwater environment may be targeted.

In some embodiments, the array 241 may be configured to receive sonar return signals. The way the sonar return signals are received and/or processed may vary depending on the desired sonar system configuration. FIGS. 2B-2C illustrate the array 241 with example possible sonar return beam coverage according to various example embodiments. In this regard, in some embodiments, each of the plurality of transducer elements are configured to operate at a fixed phase shift (e.g., at one of 0°, π/2 radian, π/4 radian, or π/8 radian) and vary in frequency (e.g., between 500 kHz-1200 kHz). This processing approach beamforms multiple sonar return beams (e.g., beam 243) between a first range of angles ($\theta_1$) 246 and between a second range of angles ($\theta_2$) 247. To explain, the sonar returns may be received by the array 241 and filtered into frequency bins based on the frequency of the signal. From that, sonar return beams 243 can be determined that provide sonar returns within a small angle window (e.g., 0.5° to 1°, although greater or lesser angle windows are contemplated). Since the orientation with respect to the watercraft can be known, and the frequency is known, then the relative angle with respect to the waterline (or other reference) can be determined and used to form sonar imagery, as described for example in U.S. Non-Provisional application Ser. No. 16/944,186, entitled "Beamforming Sonar System with Improved Sonar Image Functionality, and Associated Methods", filed Jul. 31, 2020, the teachings of which are hereby incorporated by reference in its entirety.

With further reference to FIG. 2B, the sonar return beams (e.g., 243) can be "steered" (e.g., along arrow R) within the first range of angles 246 based on varying the frequency (e.g., between 246a and 246b). Likewise, the sonar return beams can be "steered" within the second range of angles 247 based on varying the frequency (e.g., between 247a and 247b). By operating the transducer elements at a fixed phase shift, two range of angles 246, 247 can be covered with sonar beams, but there is also a gap (e.g., indicated by the range of angles β) that may not be able to be covered by the frequency steered sonar return beams.

Without being bound by theory, a perhaps simplified explanation of this can be based on considering a single beam shape that is formed by a receipt event of the array. The beam shape is formed of a rather wide main beam lobe, along with at least one relatively small defined side lobe (e.g., the beam 243) that extends outwardly therefrom. By operating at a fixed phase shift and ignoring the main beam lobe, the sonar return signals received within the side lobe can be determined. Further, changing the frequency causes a shifting of the direction of the side lobe among the range of angles (246 or 247). Since the side lobe is symmetrical about the main lobe, there are two ranges of angles that are symmetrical about the facing direction $D_{FD}$ of the emitting face 245 of the array 241.

Further information regarding beamforming, including frequency steered beamforming, can be found, for example, in the following: U.S. Pat. No. RE45,379, entitled "Frequency Division Beamforming for Sonar Arrays"; U.S. Pat. No. 10,114,119, entitled "Sonar Systems using Interferometry and/or Beamforming for 3D Imaging"; U.S. Pat. No. 9,739,884, entitled "Systems and Associated Methods for Producing a 3D Sonar Image"; and U.S. patent application Ser. No. 16/382,639, published as U.S. Publication No. 2019/0265354, and entitled "Sonar Transducer Having Geometric Elements"; the contents of each hereby being incorporated by reference in their entireties.

Depending on various factors, different beam shapes can be achieved and different ranges of angles can be achieved. The following describes some example factors that can be varied to effect the beam shapes and different ranges of angles: the number of transducer elements, the size/shape of the transducer elements, the size/shape of the array, the fixed phase shift, the frequency range, among other things. An example embodiment produces a first range of angles spanning ~22.5° and a second range of angles spanning ~22.5° with a gap of range of angles of ~45° therebetween. Additionally, sonar return beams of ~0.5° to 1° are formed. Further, with reference to FIG. 2C, a transverse beamwidth $\theta_3$ of ~20° is formed (although other transverse beamwidths are contemplated such as between ~9° and 27°). Some example embodiments that may achieve such example beam shapes include an array length of between ~100-150 mm; an array width of between ~3-10 mm; an array thickness of between ~1-3 mm; a number of transducer elements of between 50-200; a width of the transducer element of between ~0.4-1 mm; and a length of the transducer element of between ~2-10 mm (although outside of these ranges is also contemplated).

In some embodiments, the system may be configured to utilize more than one array, where the arrays are oriented relative to each other to increase the coverage volume of the underwater environment. For example, in some embodiments, a second (or more) array(s) can be added and tilted relative to the first array such that the gap within the first array is "covered" by one or more of the range of angles of sonar return beams from such array(s). FIG. 3 illustrates an example three array assembly 341 that is designed to provide continuous sonar coverage utilizing beamformed sonar return beams. The sonar assembly 341 includes a first array 341', a second array 341", and a third array 341''' having a common center point 341a. However, the first array 341' is oriented with a facing direction (e.g., substantially straight down relative to the figure) so as to produce a first range of angles 346' and a second range of angles 347' (with a gap in between as discussed above with reference to FIG. 2B). The second array 341" is oriented with a facing direction at an angle (e.g., −22.5° relative to the facing direction of the first array 341') so as to produce a first range of angles 346" and a second range of angles 347" (with a gap in between). The third array 341''' is oriented with a facing direction at another angle (e.g., −45° relative to the facing direction of the first array 341') so as to produce a first range of angles 346''' and a second range of angles 347''' (with a gap in between). As so arranged, the gaps between each set of the two range of angles are covered by a range of angles from each of the other two arrays. The illustrated example thus provides continuous sonar beam coverage for ~135°, although other overall coverage angles are contemplated such as angles ranging from 90°-140°.

FIG. 4 illustrates a watercraft 100 with an example transducer array 441 oriented such that its three arrays provide continuous sonar coverage 443 horizontally in the forward direction relative to the watercraft 100 (e.g., port-to-starboard). In this regard, the three arrays work together to provide corresponding ranges of angles 446', 447', 446", 447", 446''', 447'''—similar to those shown and described with respect to FIG. 3. In the illustrated embodiments, the lengths of each of the emitting faces of the three arrays extends in the port-to-starboard direction of the watercraft. As noted above, the frequency of the sonar return beams can be varied to provide a sonar return beam 448 that can sweep (e.g., along arrow A) within the sonar beam coverage 443 (e.g., across the three arrays)—to capture sonar return signals along the sonar beam coverage. With the array 441 as in FIG. 4, the resulting 2D live sonar image would show a live (or near real-time) sonar image corresponding to the volume extending in front of the watercraft according to the beam coverage 443. While FIG. 4 depicts the coverage volume 443 extending directly out from the bow of the boat, sonar systems in accordance with the present teachings are configured to adjust the orientation of the sonar array 441, for example, independent of the orientation of the watercraft 100.

FIG. 5 illustrates an example sonar system 500 for providing a sonar image of an underwater environment based on sonar return data obtained by a transducer array 541 of a sonar assembly 540 and a sonar steering system 570 responsive to sonar steering commands in order to adjust the aim of the transducer array 541. The transducer array 541 may be positioned within a transducer housing 542 and aimed in a facing direction (e.g., arrow $F_F$). The housing 542 may also include an orientation/position sensor 543, such as gyroscope or other orientation sensor (e.g., accelerometer, MEMS, direction, etc.) that can be configured to determine the relative orientation and/or vertical position of the sonar transducer arrays 541—such as with respect to the watercraft and/or the real world. Such information may be used in conjunction with and/or for, for example, the sonar steering system 570.

As shown, the sonar assembly 540 includes an elongate shaft 549 extending along an axis A1 between a first end 549a and a second end 549b, a main housing 544 that at least partially contains a sonar steering system 570, and the transducer array 541. The transducer array 541 is disposed proximate to the second end 549b of the shaft 549 and is configured to be disposed within an underwater environment when the sonar assembly 540 is attached to a watercraft. The transducer housing 542 may be operatively coupled to the shaft 549 and/or the sonar steering system 570 to enable change in the orientation and/or vertical position of the transducer housing 542 and/or sonar transducer array 541. For example, the transducer housing 542 may be rotatably attached to two arms 548a, 548b to enable rotation about a second axis A2 (such as to enable tilting of the sonar transducer array 541)—although other orientation changing means are contemplated. In some embodiments, various mechanisms, e.g., a motor, gears, belt drive, etc., may be employed to enable controlled orientation changing.

In some embodiments, when the sonar assembly 540 is attached to the watercraft and the transducer array 541 is submerged in the water, the main housing 544 may be positioned out of the body of water and visible/accessible by a user. The main housing 544 may be configured to house components of the sonar system 500, such as may be used for processing sonar data and/or controlling operation of the motors 570a-c, among other things. For example, depending on the configuration and features of the sonar assembly 540, the main housing 544 may contain, for example, one or more of a processor 580, a memory, a communication interface, a sonar steering system 570 and an autopilot navigation assembly.

As noted above, the facing direction of the transducer array 541 may be adjusted using various mechanisms, e.g., one or more motors, gears, belt drive, etc. By way of example, the sonar steering system may contain a motor (or a plurality of motors) that individually or in combination are controlled to adjust the orientation of the emitting face of the transducer array about one or more axes. As depicted in FIG. 5, the example sonar steering system 570 comprises three motors 570a, 570b, and 570c disposed within the housing 544, though it will be appreciated that fewer or more motors may be utilized in accordance with the present teachings to provide orientation adjustments to the transducer array 541 along three axes as discussed below or in any number of desired directions. Moreover, it will be appreciated that though the motors 570a, 570b, and 570c are disposed within the housing 544, various portions of the sonar steering system 570 may be disposed at various locations to perform the adjustments to the orientation of the transducer array 541 as otherwise discussed herein. In some embodiments, the first motor 570a may be coupled to the shaft 549 so as to adjust the length of the shaft disposed within the underwater environment, for example, by changing the length of the shaft 549 (e.g., with an inner portion being extended from or retracted within an outer portion) or by moving the shaft 549 along its axis A1. In some example embodiments, the second motor 560b may be coupled to the shaft 549 so as to rotate the shaft 549 about its axis A1. In some example embodiments, the third motor 570c may be configured to tilt the emitting direction of the one or more sonar transducer elements 571 toward or away from the water surface, for example, by tilting at least a portion of the sonar assembly 540. By way of example, the third motor 570c may be coupled to the transducer array 541 (or a housing containing the same), for example, via one or more cables so as to tilt (e.g., pivot) the emitting face of the transducer array 541 toward or away from the water surface (e.g., such as described above). Alternatively, for example, the third motor 570c may tilt the shaft 549 itself such that the axis A1 of the shaft 549 would no longer be substantially perpendicular to the water surface as in the depicted orientation of FIG. 5.

As shown, the system 500 also includes a processor 580 for controlling operation of the sonar steering system 570, the display 590, and/or the transducer array 541. Though the processor 580 is depicted as being disposed within the main housing 544 and may be electrically coupled to the sonar steering motors 570a-c and the transducer array 541, it will be appreciated that the processor 580 may be disposed in a variety of locations, including remote from the main housing 544 such that commands to the various components may be provided wirelessly.

With reference again to FIG. 5, the main housing 544 is connected to the shaft 549 proximate the first end 549a of the shaft 549 and can, in some embodiments, include an attachment device 571 (e.g., a clamp, a mount, or a plurality of fasteners) to enable connection or attachment of the sonar assembly 540 to the watercraft. In some embodiments, the main housing may also include a handle (not shown) that enables mechanical steering of the transducer array 541 by a user (e.g., through angular rotation of the shaft 549 about axis A1) and/or moving the sonar assembly 540 to and from a stowed configuration.

As depicted in FIG. 5, the sonar system 500 may in some embodiments additionally include a display 590 that may be wired or wirelessly connected to the main housing 544 to display sonar data. In some aspects, the display 590 may be a handheld device or may be a display interface executed on a user device (e.g., a tablet computer, smart phone, or the like), a marine electronic device of the watercraft, or other remote operating device. In various embodiments, the displayed sonar image may include an indicator for the user of the orientation of the transducer array 541 relative to the display 590. By way of example, an arrow overlaid on the sonar image may indicate to the user the direction of the coverage volume of the transducer array relative to current orientation of the display 590. In some such embodiments, the orientation of a display may be adjusted by the user, for example, such that the display and the transducer array 541 are similarly aligned (e.g., when the arrow points straight up on the display) to help the user determine where to cast, for example.

In some aspects, a human-computer interface may be associated with the display 590 to additionally enable receipt of user input. Such a user interface may include a touchscreen, buttons, switches, and/or keys that enable a user to input sonar steering commands, input a target, and select a target as discussed otherwise herein, all by way of non-limiting example. For example, in addition to displaying a sonar image, the display 590 may additionally in some embodiments present a chart (e.g., a navigational chart) depicting the location of the watercraft within a body of water. In such example embodiments, the sonar system 500 can be enabled to utilize a location sensor, such as a radar or global position system (GPS) sensor indicating the location of the watercraft (or the transducer array 541 coupled thereto). Using a touchscreen or cursor, for example, the user may select an area of interest on the navigational chart for which the user desires to obtain sonar data. Upon receipt of the user's selected area of interest, the processor 580 may generate sonar steering commands such that the sonar steering system 570 maintains the aim of the transducer array 541 at the coordinates of the selected chart location as the location and/or orientation of the watercraft changes. Similarly, the user may input (e.g., type) an area of interest such as a geo-positional coordinates or a compass heading and the processor 580 may generate sonar steering commands such that the sonar steering system 570 maintains the aim of the transducer array 541 at the user-selected target as discussed otherwise herein.

In addition to setting a target for the transducer array 541 to maintain within its coverage area, certain embodiments additionally or alternatively enable direct user input regarding the aim of the transducer array 541. By way of non-limiting example, a remote control, foot pedal, or other controller operated by the user may enable the user to provide steering commands regarding the horizontal rotation, tilt, and/or vertical position of the coverage area of the transducer array 541. For example, a user desiring to sweep the coverage volume horizontally may input such a command by depressing a button on a remote control to cause the transducer array 541 to obtain a sonar image of the 360° underwater environment by rotating the shaft 549 about its axis A1. Likewise, a foot pedal assembly (not shown) coupled to the processor 580 may be configured to be pivoted with a user's foot (e.g., toes and/or heel) so as to cause the shaft 549 and transducer array 541 to rotate (e.g., about axis A1). In some embodiments, pivoting the pedal in a first direction (e.g., when the user applies toe-down pressure on the pedal) may cause the sonar steering system 540 to rotate the transducer array 541 in a clockwise direction, while pivoting the pedal in a second direction (e.g., when the user applies heel-down pressure on the pedal) instead causes the sonar steering system 540 to rotate the transducer array 541 in a counterclockwise direction.

As an alternative to or in addition to receiving user input via one or more buttons associated with the sonar assembly 540 (e.g., one or more buttons on the main housing 544), a user interface associated with the display 590, a remote controller, and/or a foot pedal, for example, certain embodiments of the present teachings additionally enable the processor 580 to receive input from the user via the detection of one or more hands-free instructions by the user. By way of non-limiting example, the aim of the transducer array 541 may be controlled based on the detection of a user's body gesture, an orientation sensor associated with the user, and a voice command from the user. As noted above with respect to FIG. 1, for example, a camera 22 (or other optical or visual sensor) associated with the watercraft 100 may, with image processing, be configured to detect and interpret one or more of the user's body gestures as a steering command regarding the desired orientation of the one or more transducers 142. Non-limiting examples of such gestures include a pointing motion, a pinching and zooming motion, and a sweeping motion. Similarly, a vibration sensor (e.g., microphone) may be configured to detect vibrations, such as vocalizations caused by the user, such that the user may control the orientation of the transducers 142 with voice commands.

Other sensors and devices suitable for obtaining hands-free sonar steering input from the user in accordance with embodiments of the present teachings include wearable devices (e.g., headsets, glasses, devices for the user's wrist/arms) and other orientation sensors associated with the user and/or the user's equipment such as an orientation sensor associated with the user's fishing pole or lure. With reference again to FIG. 5, in certain modes of operation, example embodiments enable the automatic, hands-free adjustment of the coverage volume of the transducer array 541 based on the user's activity. By way of example, orientation sensors may generally be configured to indicate the direction of the user's cast such that the sonar steering system 570 may adjust the coverage volume accordingly. In this manner, the sonar image provided by the display 590 may automatically depict the area of the body of water upon which the user is focused, for example.

Example systems and methods that could be utilized with various embodiments of the present disclosure, such as for pointing, operating, or otherwise controlling sonar systems, are described further in U.S. Non-Provisional application Ser. No. 16/791,335, entitled "Systems and Methods for Controlling Operations of Marine Vessels", filed Feb. 14, 2020, U.S. Pat. No. 10,324,175, entitled "Operating a Sonar Transducer", U.S. Patent Publication No. 2017/0038460, entitled "Wireless Sonar Receiver", U.S. Patent Publication No. 2018/0288990, entitled "Castable Sensor Device", U.S. Patent Publication No. 2019/0072951, entitled "Castable Sonar Devices and Operations in a Marine Environment", and U.S. Patent Publication No. 2019/0331779, entitled "Sonar Transducer having a Gyroscope", which are all owned by the Assignee of the present application and incorporated herein by reference.

Figure 6A:
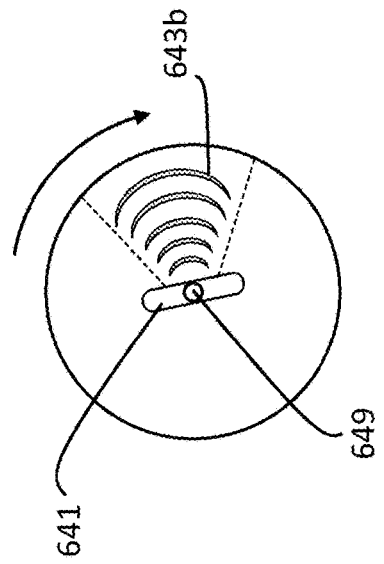
Figure 6B:
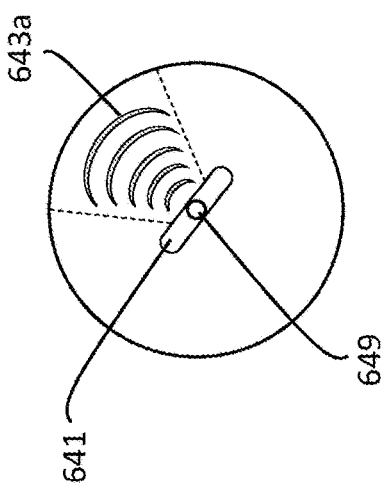
Figure 6C:
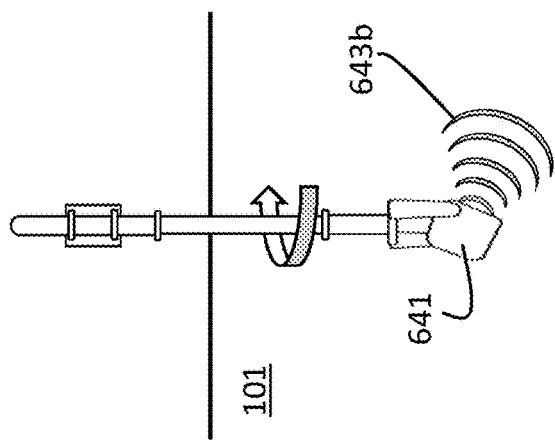
Figure 6D:
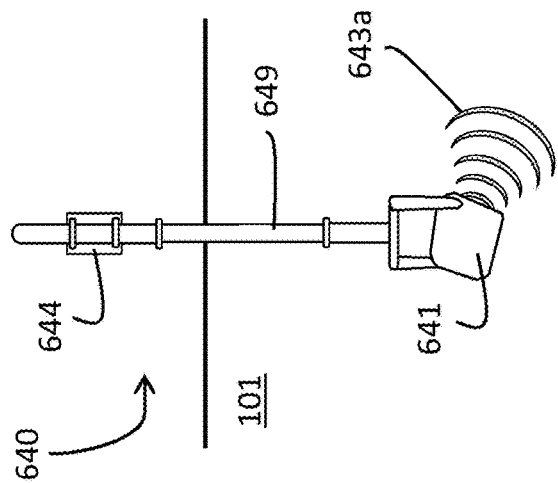

FIGS. 6A-D depict utilizing a sonar steering system in accordance with some embodiments to adjust the orientation of the sonar transducer(s) so as to adjust the coverage volume horizontally within the water. As depicted in FIG. 6A, the sonar assembly 640 comprises an array 641 of transducers that is coupled to a main housing 644 via a shaft 646. The main housing 644 is coupled to the watercraft such that the shaft 646 extends below the waterline and the array 641 can emit a sonar beam 643$a$ into the water. FIG. 6B schematically depicts from above the coverage beam 643$a$ generated by the sonar assembly 640 oriented as in FIG. 6A. In accordance with certain embodiments of the present teachings, a sonar steering system, which may at least partially be contained within the housing 644 as discussed above with reference to FIG. 5, may be caused (e.g., under the control of one or more processors) to adjust the facing direction of the array 641 horizontally within the water 101, for example, by rotating the shaft 646 about its longitudinal axis as shown in FIG. 6C. FIG. 6D schematically depicts from above the corresponding adjusted coverage beam 643b generated by the sonar assembly 640 oriented as in FIG. 6C.

With reference now to FIGS. 7A-B, a sonar steering system in accordance with certain embodiments may additionally or alternatively be configured to adjust the orientation of the array 741 by adjusting the angle of the emitting face relative to the water surface. In particular, in FIG. 7A, the emitting face of the array 741 (and beam 743a) is directed nearly straight down (e.g., toward the underwater floor). In accordance with certain embodiments of the present teachings, a sonar steering system may be caused under the control of one or more processors to tilt the array 741, for example, by rotating the array 741 such that the facing direction of the beam 743b is angled away from the underwater floor and toward the water surface as depicted in FIG. 7B.

With reference now to FIGS. 8A-B, a sonar steering system in accordance with certain embodiments may additionally or alternatively be configured to adjust the coverage volume by adjusting the vertical position (e.g., depth) of the array 841 beneath the water surface. Comparing FIGS. 8A and 8B, the sonar steering system may decrease the length of the shaft 849 disposed under the water surface, thereby decreasing the depth of the emitting face of the array 841. As depicted, the coverage volume of the beam 843a of FIG. 8A is generally deeper than the coverage volume of the beam 843b. In accordance with various aspects of the present teachings, various embodiments of sonar systems not only provide for changing the vertical position of the array 841 as in FIG. 8A-B to adjust the coverage volume, but additionally or alternatively to adjust the vertical position in response to detection via the sonar assembly of objects within the water that may damage the sonar assembly or other components of the watercraft. By way of example, the processor may determine based on sonar data that an object in the water is being approached and could collide with the watercraft. In such instances, the processor may cause the steering assembly to decrease the depth of the transducer array 841 (e.g., raise the transducer array) to avoid a collision, provide a warning to the operator of a potential collision, and/or automatically cause the motor assembly (e.g., trolling motor 108 of FIG. 1) to be raised to avoid damage.

With reference now to FIGS. 9A-12, various methods of utilizing embodiments of sonar systems described herein are schematically depicted. With particular reference to FIG. 9A, a watercraft 100 is depicted facing due east. A user, which may desire to obtain sonar images of the compass direction of 0°, may input the compass heading (e.g., on the user interface of a display). Upon receiving the user input, a processor may adjust the orientation of the transducer array 941 such that the facing direction of the array 941 is due north. Alternatively, rather than input a particular compass direction, the user may opt to "compass lock" the transducer array 941 at the orientation of FIG. 9A, for example, due to the presence of promising structures and or fish as displayed in the sonar image or as known to the user. In any event, upon the orientation of the watercraft 100 changing (e.g., heading ESE) due to propulsion from the watercraft's trolling motor, the wind, and/or current, for example, the sonar steering system can be caused to automatically rotate the array 941 such that its facing direction remains directed due north.

With particular reference to FIGS. 10A-B, another example embodiment of a method of utilizing sonar systems described herein is schematically depicted. As shown in FIG. 10A, a watercraft 100 is depicted facing due east. A user, upon identifying an area of interest likely to hold fish (e.g., based on sonar data), may input the GPS coordinates or select the location on a navigation chart, for example, on the user interface of a display to "location lock" the AOI. In this manner, if the orientation of the watercraft 100 changes as in FIG. 10B (e.g., heading ESE) the sonar steering system can be caused to automatically rotate the array 941 such that its facing direction remains directed at the target location. It will be appreciated that orientations of the transducer array 941 in the "compass lock" mode (FIG. 9B) and the "location lock" mode (FIG. 10B) differ as the orientation in the "location lock" mode is adjusted for both direction and distance to the target, while the "compass lock" mode merely takes into account the desired direction.

With particular reference now to FIG. 11, another example embodiment of a method of utilizing sonar systems described herein is schematically depicted. As shown in FIG. 11, a watercraft 100 is depicted traversing a course facing due east (as indicated by the arrow). A user, upon identifying a target object (e.g., a fish, a lure, a school of fish, structure, a promising location, etc.) of the sonar image when the boat is in the first position (on the left of FIG. 11), may select the target object and enter "object lock" mode. By way of example, the user may utilize a touchscreen on the display associated with the sonar system to select the object as the target. Alternatively, a processor may select the target automatically, for example, based on characteristics obtained from the sonar data. It will be appreciated, for example, that different sizes and species of fish have different sonar return characteristics such that fish of a particularly desirable size/species may be recognized and automatically selected for targeting. In some embodiments, a plurality of objects within the sonar image displayed to the user may appear. For example, when the boat is in the first position in FIG. 11, two fish may be within the sonar coverage volume 1143 such that the user may be able to select the fish having the desired characteristics (e.g., selecting the target on the sonar image). Alternatively, in some embodiments, the processor may be able to automatically select the fish among a plurality of objects identified by the sonar return, based for example, on prior knowledge of the user's desired size/species.

As depicted in the second (middle) and third (right) positions as the watercraft 100 proceeds east, the sonar system may be configured to automatically adjust the orientation of the sonar transducer array 941 to maintain the target object within the coverage volumes 1143', 1143". Notably, the non-targeted object that was present in the first sonar image is outside of the coverage angle in the second and third corresponding sonar image as the processor has caused the steering assembly to adjust for the selected target object. It will also be appreciated that where the target object in FIG. 11 were stationary, the adjustments to the orientation of transducer array 941 would be identical using either the "location lock" mode of FIG. 10 or the "object lock" mode of FIG. 11. However, if the target object of FIG. 11 was moving, the "object lock" mode can provide adjustments to the coverage volume so as to account for the movement of the object, for example, by determining deviations in the sonar data across a series of sonar returns from where a stationary object would be expected to calculate a speed and/or direction of travel of the object.

With reference to FIG. 12, another example embodiment of a method of utilizing sonar systems described herein is schematically depicted. As shown in FIG. 12, a watercraft 100 is depicted in a first position (on the left of FIG. 12) when a moving target is identified based on the sonar data (e.g., automatically or due to the input of a user). In this example, a user may select the target and enter "object tracking" mode such that the processor(s) of the sonar system not only adjusts the orientation and/or vertical position of the transducer array 941 to maintain the object within the coverage volume (e.g., via sonar steering system instructions), but is also configured to control the motor assembly to propel the watercraft relative to the moving target (e.g., via motor assembly instructions). By way of example, the processor of certain embodiments of the sonar systems described herein may, in addition to determining and providing sonar steering system instructions, determine and provide motor assembly instructions to cause the motor assembly to operate with a desired thrust and direction, such as to maintain the watercraft 100 within a predetermined threshold distance of the moving object, such as 5 ft., 10 ft., or other suitable distance. In this manner, some embodiments of sonar systems in accordance with the present teachings may enable the automatic tracking of a moving object, for example, to maintain the watercraft 100 within casting distance of the target.

Example System Architecture

FIG. 13 illustrates a block diagram of an example system 1300 according to various embodiments of the present invention described herein. The illustrated system 1300 includes a marine electronic device 1360. The system 1300 may comprise numerous marine devices. As shown in FIG. 13, one or more sonar transducer arrays 1341 may be provided. A radar 1316, a primary motor 1305, a trolling motor 1308, a sonar steering system 1340, and additional sensors/devices 1361 may also be provided as marine devices, but other marine devices may be provided as well. One or more marine devices may be implemented on the marine electronic device 1360. For example, a position sensor 1362, a direction sensor 1320, an autopilot 1363, and other sensors 1364 may be provided within the marine electronic device 1360. These marine devices can be integrated within the marine electronic device 1360, integrated on a watercraft at another location and connected to the marine electronic device 1360, and/or the marine devices may be implemented at a remote device 1365 in some embodiments. The system 1300 may include any number of different systems, modules, or components; each of which may comprise any device or means embodied in either hardware, software, or a combination of hardware and software configured to perform one or more corresponding functions described herein.

The marine electronic device 1360 may include at least one processor 1366, a memory 1367, a communication interface 1368, a user interface 1369, a display 1390, autopilot 1363, and one or more sensors (e.g. position sensor 1362, direction sensor 1320, other sensors 1364). One or more of the components of the marine electronic device 1360 may be located within a housing or could be separated into multiple different housings (e.g., be remotely located).

The processor(s) 1366 may be any means configured to execute various programmed operations or instructions stored in a memory device (e.g., memory 1367) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 1366 as described herein. For example, the at least one processor 1366 may be configured to analyze sonar return data for various features/functions described herein (e.g., generate a sonar image, determine an object and/or object position, etc.).

In some embodiments, the at least one processor 1366 may be further configured to implement signal processing. In some embodiments, the at least one processor 1366 may be configured to perform enhancement features to improve the display characteristics of data or images, collect or process additional data, such as time, temperature, GPS information, waypoint designations, or others, or may filter extraneous data to better analyze the collected data. The at least one processor 1366 may further implement notices and alarms, such as those determined or adjusted by a user, to reflect proximity of other objects (e.g., represented in sonar data), to reflect proximity of other vehicles (e.g. watercraft), approaching storms, etc.

In an example embodiment, the memory 1367 may include one or more non-transitory storage or memory devices such as, for example, volatile and/or non-volatile memory that may be either fixed or removable. The memory 1367 may be configured to store instructions, computer program code, sonar data, and additional data such as radar data, chart data, location/position data in a non-transitory computer readable medium for use, such as by the at least one processor 1366 for enabling the marine electronic device 1360 to carry out various functions in accordance with example embodiments of the present invention. For example, the memory 1367 could be configured to buffer input data for processing by the at least one processor 1366. Additionally or alternatively, the memory 1367 could be configured to store instructions for execution by the at least one processor 1366.

The communication interface 1368 may be configured to enable communication to external systems (e.g. an external network 1370). In this manner, the marine electronic device 1360 may retrieve stored data from a remote device 1365 via the external network 1370 in addition to or as an alternative to the onboard memory 1367. Additionally or alternatively, the marine electronic device 1360 may transmit or receive data, such as sonar signal data, sonar return data, sonar image data, or the like to or from a sonar transducer arrays 1341. In some embodiments, the marine electronic device 1360 may also be configured to communicate with other devices or systems (such as through the external network 1370 or through other communication networks, such as described herein). For example, the marine electronic device 1360 may communicate with a propulsion system of the watercraft 100 (e.g., for autopilot control); a remote device (e.g., a user's mobile device, a handheld remote, etc.); or another system. Using the external network 1370, the marine electronic device may communicate with and send and receive data with external sources such as a cloud, server, etc. The marine electronic device may send and receive various types of data. For example, the system may receive weather data, data from other fish locator applications, alert data, among others. However, this data is not required to be communicated using external network 1370, and the data may instead be communicated using other approaches, such as through a physical or wireless connection via the communications interface 1368.

The communications interface 1368 of the marine electronic device 1360 may also include one or more communications modules configured to communicate with one another in any of a number of different manners including, for example, via a network. In this regard, the communications interface 1368 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 1300.

The position sensor 1362 may be configured to determine the current position and/or location of the marine electronic device 1360 (and/or the watercraft 100). For example, the position sensor 1362 may comprise a GPS, bottom contour, inertial navigation system, such as machined electromagnetic sensor (MEMS), a ring laser gyroscope, or other location detection system. Alternatively or in addition to determining the location of the marine electronic device 1360 or the watercraft 100, the position sensor 1362 may also be configured to determine the position and/or orientation of an object outside of the watercraft 100.

The display 1390 (e.g. one or more screens) may be configured to present images and may include or otherwise be in communication with a user interface 1369 configured to receive input from a user. The display 1390 may be, for example, a conventional LCD (liquid crystal display), a touch screen display, mobile device, or any other suitable display known in the art upon which images may be displayed.

In some embodiments, the display 1390 may present one or more sets of data (or images generated from the one or more sets of data). Such data includes chart data, radar data, sonar data, weather data, location data, position data, orientation data, sonar data, or any other type of information relevant to the watercraft. Sonar data may be received from one or more sonar transducer arrays 1341 or from sonar devices positioned at other locations, such as remote from the watercraft. Additional data may be received from marine devices such as a radar 1316, a primary motor 1305 or an associated sensor, a trolling motor 1308 or an associated sensor, sonar steering system 1340, an autopilot, a position sensor 1362, a direction sensor 1320, other sensors 1364, a remote device 1365, onboard memory 1367 (e.g., stored chart data, historical data, etc.), or other devices.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 1369 may include, for example, a keyboard, keypad, function keys, mouse, scrolling device, input/output ports, touch screen, or any other mechanism by which a user may interface with the system.

Although the display 1390 of FIG. 13 is shown as being directly connected to the at least one processor 1366 and within the marine electronic device 1360, the display 1390 could alternatively be remote from the at least one processor 1366 and/or marine electronic device 1360. Likewise, in some embodiments, the position sensor 1362 and/or user interface 1369 could be remote from the marine electronic device 1360.

The marine electronic device 1360 may include one or more other sensors/devices 1364, such as configured to measure or sense various other conditions. The other sensors/devices 1364 may include, for example, an air temperature sensor, a water temperature sensor, a current sensor, a light sensor, a wind sensor, a speed sensor, or the like.

The sonar transducer array 1341 illustrated in FIG. 13 may include one or more sonar transducer array(s) and/or elements 1342 (e.g., of any type), such as described herein. In some embodiments, additional separate sonar transducer elements (arranged to operate alone, in an array, or otherwise) may be included. The sonar transducer arrays 1341 may also include a sonar signal processor or other processor (although not shown) configured to perform various sonar processing. In some embodiments, the processor (e.g., at least one processor 1366 in the marine electronic device 1360, a controller (or processor portion) in the sonar transducer arrays 1341, or a remote controller—or combinations thereof) may be configured to filter sonar return data and/or selectively control transducer element(s) 1342. For example, various processing devices (e.g., a multiplexer, a spectrum analyzer, A-to-D converter, etc.) may be utilized in controlling or filtering sonar return data and/or transmission of sonar signals from the transducer element(s) 1342.

The sonar transducer arrays 1341 may also include one or more other systems, such as various sensor(s) 1371. For example, the sonar transducer arrays 1341 may include an orientation sensor, such as gyroscope or other orientation sensor (e.g., accelerometer, MEMS, direction, etc.) that can be configured to determine the relative orientation and/or direction of the sonar transducer arrays 1341 and/or the one or more sonar transducer array(s) and/or element(s) 1342—such as with respect to the watercraft. Such information may be used in conjunction with and/or for, for example, the sonar steering system 1216, such as to determine the current vertical position and/or orientation of the sonar transducer array 1341 that is part of various sonar assemblies (e.g., the sonar assembly 140, 441, 500, 640, 740, 840) described herein. In some embodiments, additionally or alternatively, other types of sensor(s) are contemplated, such as, for example, a water temperature sensor, a current sensor, a light sensor, a wind sensor, a speed sensor, or the like.

The components presented in FIG. 13 may be rearranged to alter the connections between components. For example, in some embodiments, a marine device outside of the marine electronic device 1360, such as the radar 1316, may be directly connected to the at least one processor 1366 rather than being connected to the communication interface 1368. Additionally, sensors and devices implemented within the marine electronic device 1360 may be directly connected to the communications interface in some embodiments rather than being directly connected to the at least one processor 1366.

Example Flowchart(s) and Operations

Some embodiments of the present invention provide methods, apparatus, and computer program products related to the presentation of information according to various embodiments described herein. Various examples of the operations performed in accordance with embodiments of the present invention will now be provided with reference to FIGS. 14 and 15. FIGS. 14 and 15 present flowcharts with example method(s) of adjusting the coverage volume of one or more sonar transducer elements according to various embodiments described herein. These methods may be performed by a wide variety of components, including, but not limited to, one or more processors, one or more microprocessors, and one or more controllers. In some embodiments, a marine electronic device 1360 (FIG. 13) may comprise one or more processors that perform the functions shown in FIGS. 14 and 15. Further, these methods may be provided on software which runs on a central server that is at a remote location away from the watercraft, and the remote server may communicate with a processor or a similar component on the watercraft. Additionally, the methods could be integrated into a software update that may be installed onto existing hardware, or the methods may be integrated into the initial software or hardware provided in a watercraft, server, various components described herein, etc.

FIG. 14 is a flowchart of an example method 1400 for adjusting (e.g., non-manually adjusting) the coverage volume of one or more sonar transducer elements, in accordance with some embodiments discussed herein. The operations illustrated in and described with respect to FIG. 14 may, for example, be performed by, with the assistance of, and/or under the control of one or more of the processor 1366, memory 1367, communication interface 1368, user interface 1369, position sensor 1362, direction sensor 1320, other sensors 1364, autopilot 1363, transducer array 1341', 1341", 1341''', sonar steering system 1340, display 1390, radar 1316, primary motor 1305, trolling motor 1308, additional sensors 1361, and/or external network 1370/remote device 1365.

At operation 1402, the method comprises operating one or more sonar transducer elements (e.g., in an array). At operation 1404, the method comprises receiving sonar return data from the one or more transducer elements, such as from a coverage angle. At operation 1406, the method comprises generating a sonar image, such as a live sonar image. At operation 1408, the method comprises receiving user input regarding a desired adjustment to the coverage volume of the transducer element(s). At operation 1410, the method comprises causing a sonar steering system to adjust the orientation of the sonar transducer element(s) in accordance with the user input. In some embodiments, the adjustment may be automatic such as to occur without direct and/or intermittent user input (e.g., when acting according to a software algorithm, when performing a sweep, when tracking a target, when on one of the various "lock" examples, etc.).

In some embodiments, the method comprises, at operation 1412, updating the sonar image with the sonar data obtained at the adjusted coverage volume.

FIG. 15 is a flowchart of an example method 1500 for adjusting (e.g., non-manually adjusting) the coverage volume of one or more sonar transducer elements, in accordance with some embodiments discussed herein. The operations illustrated in and described with respect to FIG. 15 may, for example, be performed by, with the assistance of, and/or under the control of one or more of the processor 1366, memory 1367, communication interface 1368, user interface 1369, position sensor 1362, direction sensor 1320, other sensors 1364, autopilot 1363, transducer array 1341', 1341", 1341''', sonar steering system 1340, display 1390, radar 1316, primary motor 1305, trolling motor 1308, additional sensors 1361, and/or external network 1370/remote device 1365.

At operation 1502, the method comprises determining a desired target of one or more sonar transducer elements. At operation 1504, the method comprises causing a sonar steering system to adjust the orientation of the sonar transducer element(s) such that the desired target is within the coverage volume of the sonar transducer element(s). At operation 1506, the method comprises operating the sonar transducer element(s) to direct one or more sonar beams toward the target. At operation 1508, the method comprises receiving sonar return data from the one or more sonar transducer elements from a coverage volume including the target. At operation 1510, the method comprises generating a sonar image, such as a live sonar image. At operation 1512, the method comprises causing the sonar steering system to adjust the orientation of the sonar transducer element(s) to maintain the target within the coverage volume due to movement of the watercraft and target relative to one another. At operation 1514, the method comprises updating the sonar image with the sonar data obtained at the adjusted coverage volume.

In some embodiments, at operation 1516, the method comprises causing the motor assembly to move relative to the target for tracking the target.

FIGS. 14 and 15 illustrates a flowchart of a system, method, and computer program product according to various example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 1367 and executed by, for example, the processor 1366. As will be appreciated, any such computer program product may be loaded onto a computer or other programmable apparatus (for example, a marine electronic device 1360) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 1360) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated That which is claimed:

1. A sonar system for providing sonar imagery of an underwater environment, the sonar system comprising:
a sonar assembly configured to attach to a watercraft having a trolling motor assembly configured to propel the watercraft to travel along a direction of travel in a body of water, the sonar assembly comprising:
an elongated shaft defining a first end and a second end, wherein, when attached to the watercraft and in a deployed position, the second end of the shaft is positioned within the underwater environment;
one or more sonar transducer elements attached to the second end of the shaft such that, when the shaft is in the deployed position, the one or more sonar transducer elements are positioned within the underwater environment, wherein the one or more sonar transducer elements are configured to transmit one or more sonar beams into the underwater environment based on a facing direction of the one or more sonar transducer elements; and
a sonar steering system comprising one or more motors, wherein the sonar steering system is configured to:
adjust, via at least one of the one or more motors rotating the shaft or the one or more motors tilting the facing direction of the one or more sonar transducer elements toward or away from a water surface of the underwater environment, an orientation of the facing direction of the one or more sonar transducer elements within the underwater environment to a plurality of directions independent of the trolling motor assembly, and
adjust, via the one or more motors raising or lower at least a portion of the shaft within the underwater environment, a vertical position within the underwater environment of the one or more sonar transducer elements such that the one or more sonar transducer elements are vertically movable within the underwater environment to different deployed vertical positions within the underwater environment without adjusting the facing direction, where the one or more sonar transducer elements are still usable within the underwater environment at the different deployed vertical positions;
a display;
one or more processors; and
a memory including computer program code configured to, when executed, cause the one or more processors to:
cause the one or more sonar transducer elements to emit one or more sonar beams into the underwater environment;
receive sonar return data from a coverage volume of the one or more sonar transducer elements, wherein the coverage volume corresponds to the orientation of the facing direction of the one or more sonar transducer elements and the vertical position of the one or more sonar transducer elements;
generate a sonar image of the coverage volume of the underwater environment based on the sonar return data;
determine trolling motor assembly instructions to provide to the trolling motor assembly for steering a motor direction of a trolling motor of the watercraft and operating the trolling motor to propel the watercraft;
determine sonar steering system instructions to provide to the sonar steering system for adjusting the coverage volume based on the trolling motor assembly instructions to enable the trolling motor assembly and the sonar steering system to work together to track a target, wherein the one or more sonar transducer elements and the trolling motor are independently steerable;
provide the trolling motor assembly instructions to the trolling motor assembly to cause the trolling motor to steer to the motor direction and operate to propel the watercraft; and
provide the sonar steering system instructions to the sonar steering system to cause the sonar steering system to adjust the coverage volume by at least one of (i) rotating the one or more sonar transducer elements about a longitudinal axis of the shaft, (ii) tilting the one or more sonar transducer elements, or (iii) adjusting the vertical position of the one or more sonar transducer elements within the underwater environment, wherein the coverage volume is adjusted to maintain the target within the coverage volume during movement of the watercraft and the target relative to one another.

2. The sonar system of claim 1, wherein the target comprises an area of interest.

3. The sonar system of claim 2, wherein the area of interest is identified by at least one of a geo-positional location and a compass heading.

4. The sonar system of claim 1, wherein the target comprises an object moving within the underwater environment.

5. The sonar system of claim 4, wherein the computer program code is further configured to, when executed, cause the one or more processors to:
operate the trolling motor assembly to propel the watercraft relative to the moving object.

6. The sonar system of claim 4, wherein the computer program code is further configured to, when executed, cause the one or more processors to:
identify the target among a plurality of objects moving within the underwater environment.

7. The sonar system of claim 6, wherein the computer program code is further configured to, when executed, cause the one or more processors to:
receive input by a user selecting the target from the plurality of objects moving within the underwater environment.

8. The sonar system of claim 1, wherein the computer program code is further configured to, when executed, cause the one or more processors to:
cause the sonar steering system to adjust the coverage volume based on an upcoming or a current direction and speed of the watercraft.

9. The sonar system of claim 1, wherein the computer program code is further configured to, when executed, cause the one or more processors to:

cause the sonar steering system to adjust the vertical position of the one or more sonar transducer elements in response to detection of a depth of an object in the underwater environment.

10. The sonar system of claim 1, wherein the computer program code is further configured to, when executed, cause the one or more processors to:
receive a command from a user to cause the sonar steering system to rotate the one or more sonar transducer elements about the longitudinal axis.

11. The sonar system of claim 10, wherein the command from the user is input via at least one of the display and a remote control.

12. The sonar system of claim 10, wherein the command from the user is based on at least one of a body gesture detection, an orientation sensor associated with the user, and a voice command.

13. A method for operating a sonar system for providing sonar imagery of an underwater environment, the method comprising:
causing one or more sonar transducer elements attached to an elongated shaft of a sonar assembly to emit one or more sonar beams into the underwater environment, wherein the shaft and the sonar assembly are attached to a watercraft having a trolling motor assembly configured to propel the watercraft to travel along a direction of travel in a body of water independently of a facing direction of the one or more sonar transducer elements, wherein, when the shaft is attached to the watercraft and in a deployed position, the one or more sonar transducer elements are positioned within the underwater environment;
receiving sonar return data from a coverage volume of the one or more sonar transducer elements, wherein the coverage volume corresponds to an orientation of the facing direction of the one or more sonar transducer elements and the vertical position of the one or more sonar transducer elements;
displaying, on a display, a sonar image of the coverage volume based on the sonar return data;
determining trolling motor assembly instructions to provide to the trolling motor assembly for steering a motor direction of a trolling motor of the watercraft and operating the trolling motor to propel the watercraft;
determining sonar steering system instructions to provide to the sonar steering system for adjusting the coverage volume based on the trolling motor assembly instructions to enable the trolling motor assembly and the sonar steering system to work together to track a target, wherein the one or more sonar transducer elements and the trolling motor are independently steerable;
providing the trolling motor assembly instructions to the trolling motor assembly to cause the trolling motor to steer to the motor direction and operate to propel the watercraft; and
providing the sonar steering system instructions to the sonar steering system to cause, by one or more processors in operable communication with a sonar steering system, the sonar steering system to adjust the coverage volume by at least one of (i) rotating the one or more sonar transducer elements within the underwater environment about a longitudinal axis of the shaft, (ii) tilting the one or more sonar transducer elements within the underwater environment, or (iii) adjusting a vertical position of the one or more sonar transducer elements within the underwater environment, wherein the coverage volume is adjusted to maintain the target within the coverage volume during movement of the watercraft and the target relative to one another,
wherein the sonar steering system comprises one or more motors, wherein the sonar steering system is configured to:
adjust, via at least one of the one or more motors rotating the shaft or the one or more motors tilting the facing direction of the one or more sonar transducer elements toward or away from a water surface of the underwater environment, the orientation of the facing direction of the one or more sonar transducer elements within the underwater environment to a plurality of directions independent of the trolling motor assembly, and
adjust, via the one or more motors raising or lower at least a portion of the shaft within the underwater environment, the vertical position within the underwater environment of the one or more sonar transducer elements such that the one or more sonar transducer elements are vertically movable within the underwater environment to different deployed vertical positions within the underwater environment without adjusting the facing direction, where the one or more sonar transducer elements are still usable within the underwater environment at the different deployed vertical positions.

14. The method of claim 13, wherein the vertical position of the one or more sonar transducer elements is adjusted in response to detection of a depth of an object in the underwater environment.

15. The method of claim 13, further comprising receiving a command from a user to cause the sonar steering system to rotate the one or more sonar transducer elements about the longitudinal axis.

16. A sonar assembly for providing sonar imagery of an underwater environment, the sonar assembly being configured to attach to a watercraft having a trolling motor assembly configured to propel the watercraft to travel along a direction of travel in a body of water, the sonar assembly comprising:
an elongated shaft defining a first end and a second end, wherein, when attached to the watercraft and in a deployed position, the second end of the shaft is positioned within the underwater environment;
one or more sonar transducer elements attached to the second end of the shaft such that, when the shaft is in the deployed position, the one or more sonar transducer elements are positioned within the underwater environment, wherein the one or more sonar transducer elements are configured to transmit one or more sonar beams into the underwater environment based on a facing direction of the one or more sonar transducer elements; and
a sonar steering system comprising one or more motors, wherein the sonar steering system is configured to:
adjust, via at least one of the one or more motors rotating the shaft or the one or more motors tilting the facing direction of the one or more sonar transducer elements toward or away from a water surface of the underwater environment, an orientation of the facing direction of the one or more sonar transducer elements within the underwater environment to a plurality of directions independent of the trolling motor assembly, and
adjust, via the one or more motors raising or lower at least a portion of the shaft within the underwater environment, a vertical position of the one or more sonar transducer elements within the underwater environment such that the one or more sonar transducer elements are vertically movable within the underwater environment to different deployed vertical positions within the underwater environment without adjusting the facing direction, where the one or more sonar transducer elements are still usable within the underwater environment at the different deployed vertical positions;

one or more processors; and a memory including computer program code configured to, when executed, cause the one or more processors to:

cause the one or more sonar transducer elements to emit one or more sonar beams into the underwater environment;

receive sonar return data from a coverage volume of the one or more sonar transducer elements, wherein the coverage volume corresponds to the orientation of the facing direction of the one or more sonar transducer elements and the vertical position of the one or more sonar transducer elements;

generate a sonar image of the coverage volume of the underwater environment based on the sonar return data;

determine trolling motor assembly instructions to provide to the trolling motor assembly for steering a motor direction of a trolling motor of the watercraft and operating the trolling motor to propel the watercraft;

determine sonar steering system instructions to provide to the sonar steering system for adjusting the coverage volume based on the trolling motor assembly instructions to enable the trolling motor assembly and the sonar steering system to work together to track a target, wherein the one or more sonar transducer elements and the trolling motor are independently steerable;

provide the trolling motor assembly instructions to the trolling motor assembly to cause the trolling motor to steer to the motor direction and operate to propel the watercraft; and provide the sonar steering system instructions to the sonar steering system to cause the sonar steering system to adjust the orientation of the coverage volume by at least one of (i) rotating the one or more sonar transducer elements about a longitudinal axis of the shaft, (ii) tilting the one or more sonar transducer elements, or (iii) adjusting the vertical position of the one or more sonar transducer elements within the underwater environment, wherein the coverage volume of the one or more sonar transducer elements is adjusted to maintain the target within the coverage volume during movement of the watercraft and the target relative to one another.

* * * * *